(12) United States Patent
Kunimine et al.

(10) Patent No.: US 8,052,271 B2
(45) Date of Patent: Nov. 8, 2011

(54) COATING LIQUID, INK JET RECORDING METHOD AND INK JET RECORDING APPARATUS

(75) Inventors: Noboru Kunimine, Tokyo (JP); Takao Ogata, Tokyo (JP); Rie Takekoshi, Kawasaki (JP); Takumi Kaneko, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 11/945,626

(22) Filed: Nov. 27, 2007

(65) Prior Publication Data

US 2008/0134935 A1    Jun. 12, 2008

(30) Foreign Application Priority Data

Dec. 8, 2006 (JP) ................................ 2006-331327
Dec. 8, 2006 (JP) ................................ 2006-331328
Nov. 16, 2007 (JP) ................................ 2007-297648

(51) Int. Cl.
*B41J 2/01* (2006.01)
*B41J 2/17* (2006.01)

(52) U.S. Cl. ......................................... 347/101; 347/95

(58) Field of Classification Search ........................ None
See application file for complete search history.

(56) References Cited

U.S. PATENT DOCUMENTS

| | | | |
|---|---|---|---|
| 4,683,002 A | 7/1987 | Mirua et al. | 106/20 |
| 5,045,865 A * | 9/1991 | Crystal et al. | 347/114 |
| 6,200,676 B1 | 3/2001 | Matsubara et al. | 428/341 |
| 6,287,700 B1 * | 9/2001 | Kong et al. | 428/447 |
| 6,331,384 B1 * | 12/2001 | Satoi | 430/347 |
| 6,540,329 B1 | 4/2003 | Kaneko et al. | 347/43 |
| 6,733,197 B2 * | 5/2004 | Koike et al. | 400/621.1 |
| 6,779,884 B1 * | 8/2004 | Ma et al. | 347/101 |
| 6,879,336 B2 * | 4/2005 | Sugiyama et al. | 347/262 |
| 7,291,211 B2 | 11/2007 | Kaneko et al. | 106/31.27 |
| 2004/0151895 A1 * | 8/2004 | Itoh et al. | 428/327 |
| 2004/0207716 A1 * | 10/2004 | Fujii et al. | 347/238 |
| 2005/0074601 A1 | 4/2005 | Onishi | 428/332 |
| 2005/0142472 A1 * | 6/2005 | Sekido et al. | 430/58.05 |
| 2006/0009544 A1 | 1/2006 | Miyagawa et al. | 523/160 |
| 2006/0130706 A1 | 6/2006 | Nakajima et al. | 106/499 |
| 2006/0142416 A1 | 6/2006 | Sakai et al. | 523/160 |
| 2006/0167136 A1 | 7/2006 | Kaneko et al. | 523/160 |
| 2006/0219133 A1 * | 10/2006 | Sakamoto et al. | 106/31.65 |

FOREIGN PATENT DOCUMENTS

| | | |
|---|---|---|
| JP | 2000-153677 | 6/2000 |
| JP | 2003-170650 | 6/2003 |
| JP | 2004-001446 | 1/2004 |
| JP | 2004-099766 | 4/2004 |
| JP | 2004-243625 | 9/2004 |
| JP | 2005-047053 | 2/2005 |
| JP | 2005-081754 | 3/2005 |

* cited by examiner

*Primary Examiner* — Manish S Shah
*Assistant Examiner* — Alexander C Witkowski
(74) *Attorney, Agent, or Firm* — Fitzpatrick, Cella, Harper & Scinto

(57) ABSTRACT

A coating liquid for use in an ink jet recording method comprising an image forming step of forming an image on a recording medium by an ink jet system with an ink comprising at least a pigment and a coating layer forming step of applying a coating liquid at least to a region including the image to form a coating layer having a film thickness of from 0.10 μm or more to 1.0 μm or less in at least a part thereof. The coating liquid comprises at least a slippery compound, water and a water-soluble organic solvent. The coating layer has a coefficient of kinetic friction of 0.40 or less.

23 Claims, 13 Drawing Sheets

MOVING DIRECTION OF STAGE

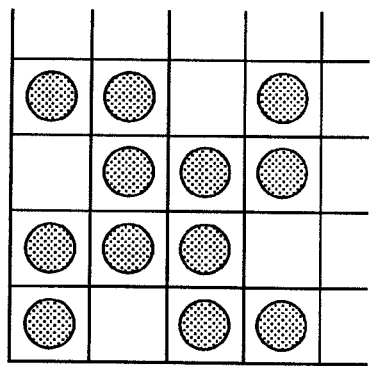
FIG. 10
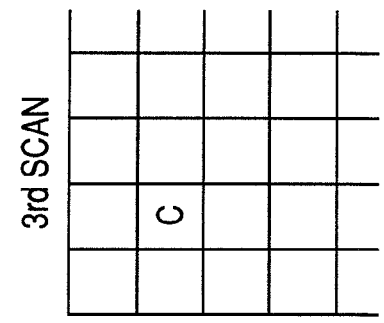
FIG. 11
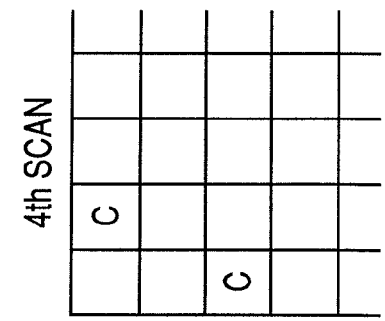
FIG. 12A 1st SCAN
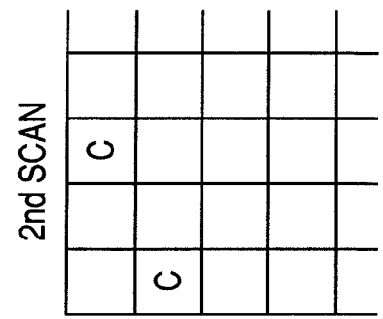
FIG. 12B 2nd SCAN
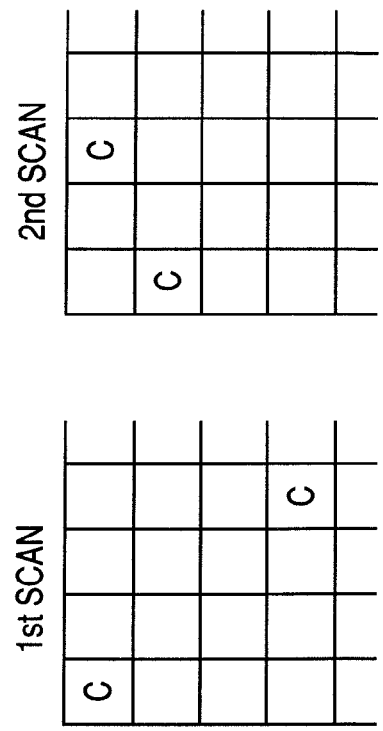
FIG. 12C 3rd SCAN
FIG. 12D 4th SCAN

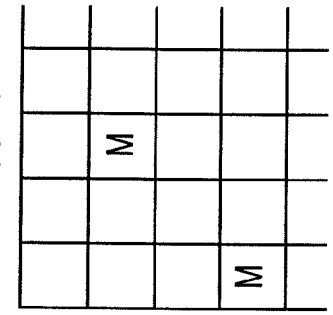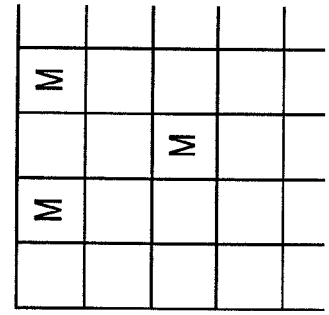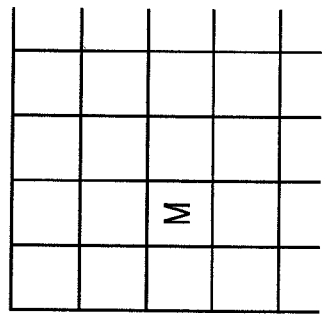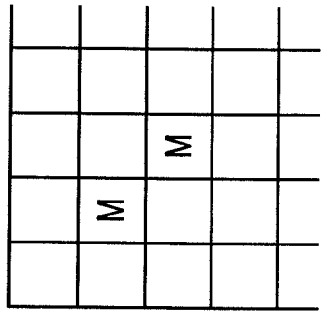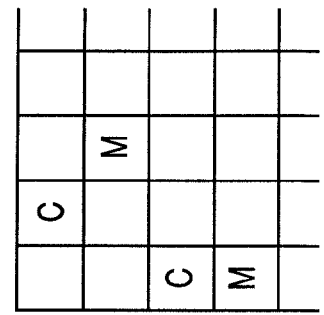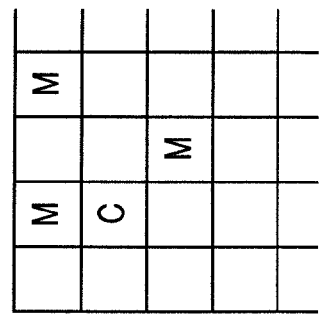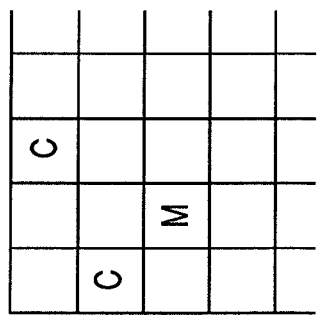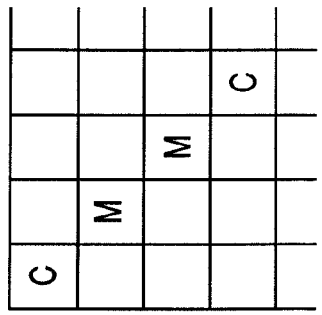

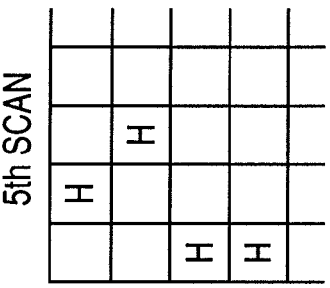
FIG. 15  FIG. 16  FIG. 17
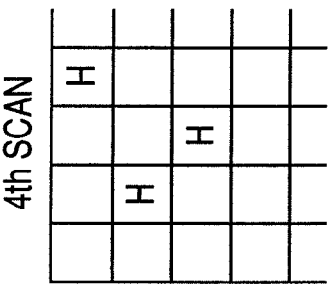
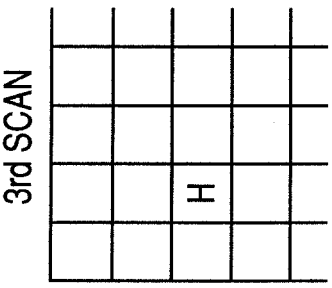
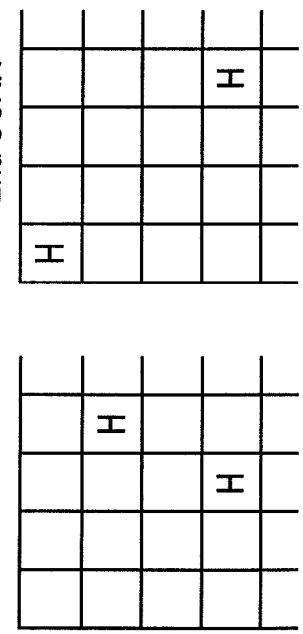
FIG. 18A 1st SCAN  FIG. 18B 2nd SCAN  FIG. 18C 3rd SCAN  FIG. 18D 4th SCAN  FIG. 18E 5th SCAN

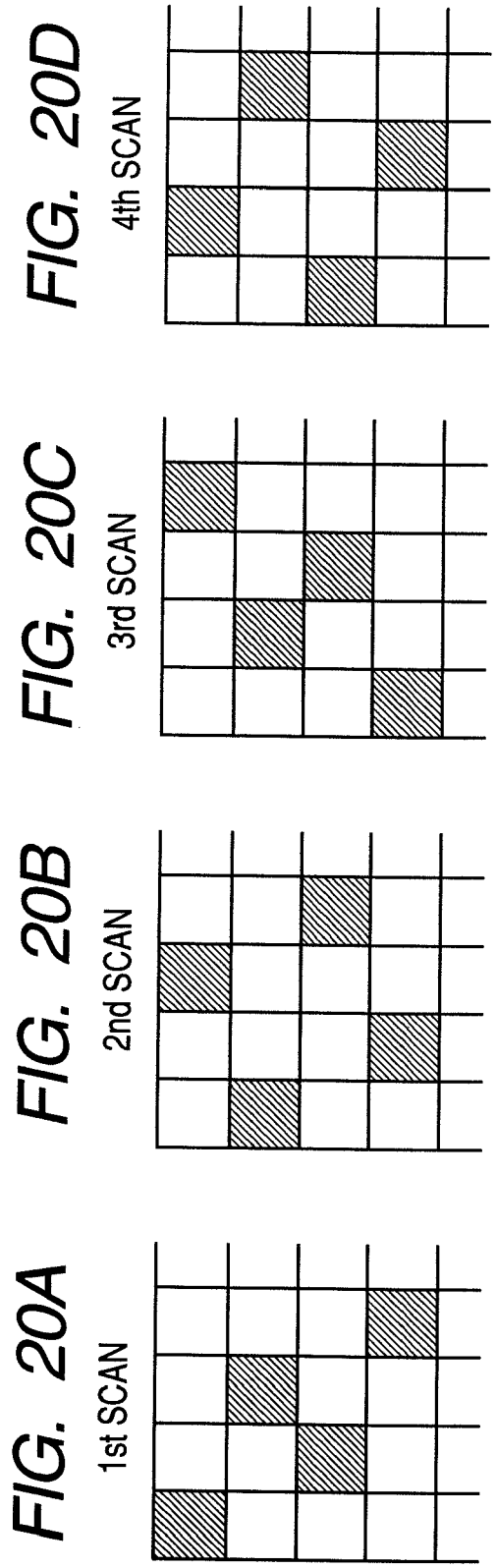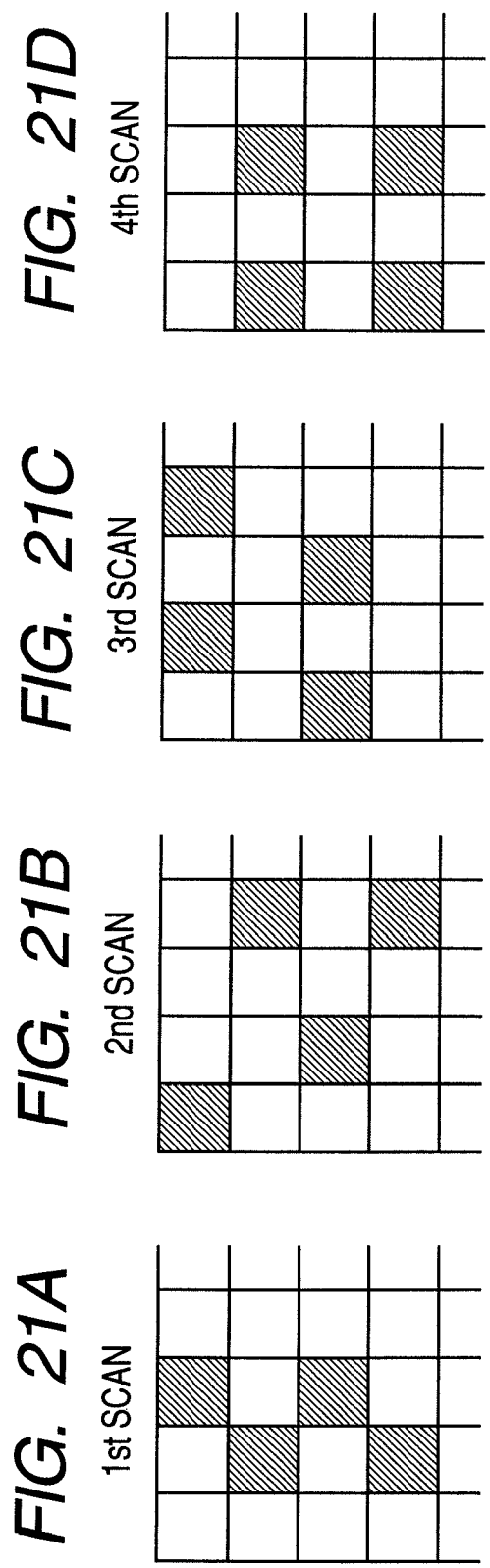

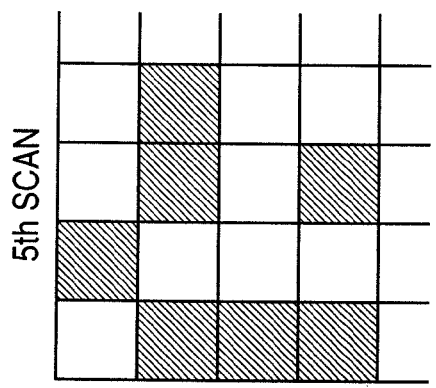
FIG. 22
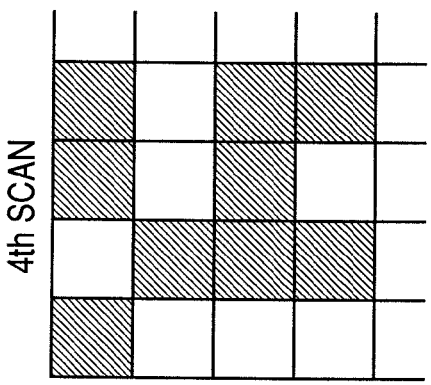
FIG. 23A
4th SCAN
FIG. 23B
5th SCAN
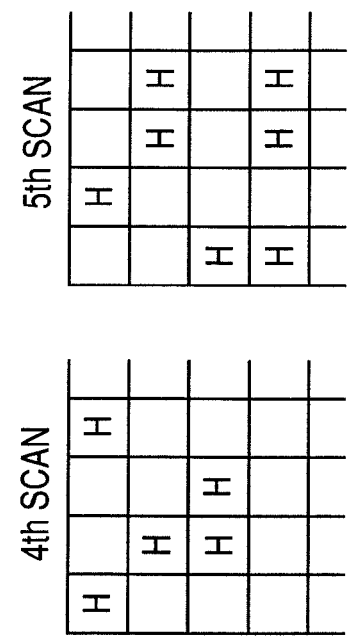
FIG. 24A
1st SCAN
FIG. 24B
2nd SCAN
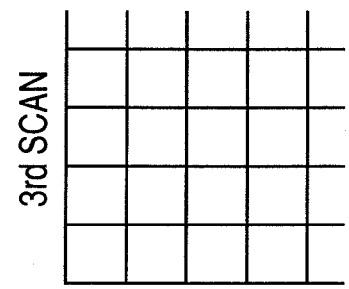
FIG. 24C
3rd SCAN
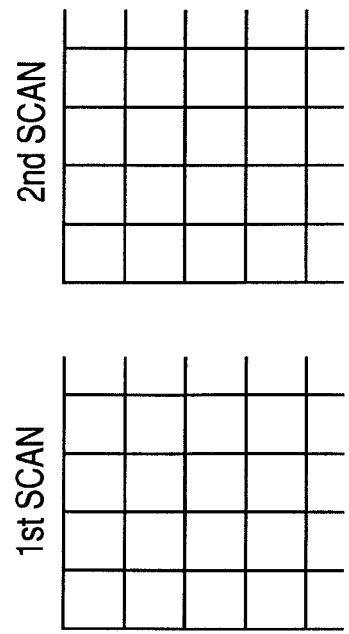
FIG. 24D
4th SCAN
FIG. 24E
5th SCAN

COATING LIQUID, INK JET RECORDING METHOD AND INK JET RECORDING APPARATUS

BACKGROUND OF THE INVENTION

1. Field of the Invention

The present invention relates to a coating liquid for coating the surface of an image recorded with a pigment ink by an ink jet system, and an ink jet recording method and an ink jet recording apparatus using the coating liquid.

2. Description of the Related Art

With the increase of high-definition images formed by an ink jet system in recent years, ink jet recording apparatus have come to be widely used for public exhibition and trademark printing such as photographs, posters and graphic prints. For this reason, there has been a strong demand for improving fastness properties of resulting images, such as long-term storability.

Inks used in an ink jet recording method are roughly divided into a dye ink containing a dye as a coloring material and a pigment ink containing a pigment as a coloring material. In the dye ink, the dye is dissolved in a molecular state in an aqueous medium. Therefore, a recorded matter formed with the dye ink has such characteristics that transparency is high, and color developability is excellent. On the contrary, the recorded matter formed with the dye ink involves a problem that it is liable to be faded by ultraviolet radiation and active gases in the air. On the other hand, in the pigment ink, the pigment is present in a state dispersed in an aqueous medium. Therefore, a recorded matter formed with the pigment ink is hard to be faded by active gases in the air and ultraviolet radiation, i.e., excellent in resistance to fading by long-term storage.

The advancement of techniques as to pigments in recent years has permitted the recorded matter formed with the pigment inks to satisfy both long-term storability and high color developability comparable to the recorded matter formed with the dye inks. Therefore, spreading of ink jet recording apparatus using pigment inks is progressing mainly in commercial printing uses such as photographs and posters, which are highly required to store recorded matters over a long period of time.

However, recorded matters obtained by an ink jet recording method using pigment inks include the problem that an image formed on a recording medium having glossiness (hereinafter may be referred to as "glossy paper") for ink jet is easy to be scratched.

A recording medium for ink jet is generally produced by forming an ink receiving layer absorbing an ink on a base material such as paper or a film. In the recording medium, the ink receiving layer contains inorganic fine particles high in absorbency to an aqueous medium, such as silica or alumina in plenty for the purpose of preventing blur of the ink on the recording medium. Since high surface smoothness is required of glossy paper among recording media for ink jet, inorganic fine particles of the submicron order are often used as a material for forming the ink receiving layer. Since a void between the inorganic fine particles, i.e. pore diameter, in the ink receiving layer of such glossy paper is proportional to the particle size of the inorganic fine particles, the inorganic fine particles of the submicron order are used.

On the other hand, a pigment in a pigment ink is dispersed as particles having a diameter of about 100 nm (nanometers). When the particle size of the pigment is more than the pore diameter of the ink receiving layer, the pigment cannot penetrate into the interior of the ink receiving layer and stays on the surface of the ink receiving layer as if the pigment was sifted.

In the glossy paper, the voids in the ink receiving layer are generally often smaller than the particle size of the pigment, so that an image formed on the glossy paper with the pigment ink has such a structure that a pigment layer is formed on the surface of the ink receiving layer. External force at the time of scratching an image is directly applied to the pigment layer forming the image. As a result, the image formed with the pigment ink is easy to be scratched and in some cases, markedly causes such a problem of scratch resistance that the pigment layer is peeled off.

In order to solve such a problem as described above, the following proposals have been made. For example, there is a proposal as to a film-laminating system in which an image is coated with a film (see Japanese Patent Application Laid-Open No. 2000-153677). There are also proposals as to a liquid-laminating system in which the surface of an image is coated with a liquid containing a resin (see Japanese Patent Application Laid-Open Nos. 2004-001446, 2004-099766, 2004-243625, 2005-047053 and 2005-081754). There is further a proposal as to a post treatment system in which a recording medium having an ink receiving layer containing thermoplastic resin particles is used, and the recording medium is heated after conducting recording, whereby a pigment layer is bonded to the ink receiving layer (see Japanese Patent Application Laid-Open No. 2003-170650).

However, it has been known that the above-described prior arts cause the following problems. First, in the film-laminating system, the surface of the image is coated with a resin film having high film strength, thereby achieving a certain scratch resistance. However, such a system involves a problem that the feel of the paper (recording medium) itself is impaired because the surface of the image is coated with the film. There is also a problem that cost becomes high because a laminating treatment is conducted by an off-line system using an apparatus separated from a recording apparatus after forming an image.

On the other hand, there is a problem described below when the liquid-laminating system is adopted. Japanese Patent Application Laid-Open No. 2004-001446 describes that an image-protecting liquid containing a lubricant (mainly, a polyethylene-containing material) is applied to form a protecting layer having a thickness of 1 to 20 μm (micrometers), thereby improving the scratch resistance of an image. However, when a coating film having a thickness of less than 1 μm, by which the feel of the paper can be retained, is formed with this protecting liquid, it is difficult to achieve sufficient scratch resistance, and it is also difficult to prevent a fine scratch caused by contact of a nail. Moreover the coefficient of kinetic friction of the coating layer formed with the protecting liquid cannot be sufficiently lowered by the above-described lubricant.

In the liquid-laminating system, a laminating treatment is conducted by an on-line system using the same recording apparatus just after forming an image. In order to achieve sufficient scratch resistance with materials comprising a conventional liquid for lamination, however, it is necessary that the film has a thickness of several micrometers. Such a thick film involves a problem that the feel of a recorded matter is impaired. For example, Japanese Patent Application Laid-Open No. 2005-081754 describes that a film having a thickness of 1 μm or less is formed. However, still higher scratch resistance is required when taking the circumstances where the recorded matter is actually used into consideration.

The post treatment system described in Japanese Patent Application Laid-Open No. 2003-170650 involves, in addition to need of using a special recording medium, a problem that the apparatus becomes large because a heat treatment is conducted.

SUMMARY OF THE INVENTION

It is accordingly an object of the present invention to provide a coating liquid for use in recording by an ink jet system, by which a recorded matter having an excellent scratch resistance can be formed without impairing the feel inherent in paper. Another object of the present invention is to provide an ink jet recording method and an ink jet recording apparatus using the coating liquid.

The above objects can be achieved by the present invention described below. The present invention thus provides a coating liquid used in an ink jet recording method comprising an image forming step of forming an image on a recording medium by an ink jet system with an ink comprising at least a pigment and a coating layer forming step of applying a coating liquid at least to a region including the image to form a coating layer having a film thickness of from 0.10 µm or more to 1.0 µm or less in at least a part thereof, wherein the coating liquid comprises at least a slippery compound, water and a water-soluble organic solvent, and the coating layer has a coefficient of kinetic friction of 0.40 or less.

The present invention also provides an ink jet recording method comprising an image forming step of forming an image on a recording medium by an ink jet system with an ink comprising at least a pigment and a coating layer forming step of applying a coating liquid to a region including at least the image to form a coating layer having a film thickness of from 0.10 µm or more to 1.0 µm or less in at least a part thereof, wherein the coating liquid is the above-described coating liquid.

The present invention further provides an ink jet recording method for conducting the formation of an image with an ink comprising at least a pigment and the formation of a coating layer with the above-described coating liquid by scanning a recording head plural times on a unit region of a recording medium by using the recording head which ejects the ink and the coating liquid based on each an ink ejection data and a coating liquid ejection data by an ink jet system, which comprises an ejection data generation step of generating a coating liquid ejection data for ejecting the coating liquid on the unit region after completion of the formation of the image with the ink and a control step of controlling ejecting the coating liquid from the recording head based on the coating liquid ejection data generated by the ejection data generation step, wherein the ejection data generation step generates the coating liquid ejection data so as to eject the coating liquid upon at least one scan including a final scan to the unit region among the scans of the plural times.

The present invention still further provides an ink jet recording apparatus for conducting the formation of an image with an ink comprising at least a pigment and the formation of a coating layer with the above-described coating liquid by scanning a recording head plural times on a unit region of a recording medium by using the recording head ejecting the ink and the coating liquid based on each an ink ejection data and a coating liquid ejection data by an ink jet system, which comprises an ejection data generation unit for generating a coating liquid ejection data for ejecting the coating liquid on the unit region after completion of the formation of the image with the ink and a control unit for controlling ejecting the coating liquid from the recording head based on the coating liquid ejection data generated by the ejection data generation unit, wherein the ejection data generation unit generates the coating liquid ejection data so as to eject the coating liquid upon at least one scan including a final scan to the unit region among the scans of the plural times.

Incidentally, the unit region means one pixel or one band, and the unit region can be preset as various regions as needed.

The present invention can provide a coating liquid, by which a recorded matter having excellent scratch resistance be formed without impairing the feel inherent in paper. Another embodiment of the present invention can provide an ink jet recording method and an ink jet recording apparatus by which the recorded matter having excellent scratch resistance applying the coating liquid by a roll coater system or an ink jet system.

Further features of the present invention will become apparent from the following description of exemplary embodiments with reference to the attached drawings.

BRIEF DESCRIPTION OF THE DRAWINGS

FIG. 10 illustrates coating liquid mask pattern stored in a memory unit for coating liquid ejection pattern in FIG. 8.

FIG. 11 illustrates the arrangement of dots formed by a cyan (C) ink and a magenta (M) ink.

FIGS. 12A, 12B, 12C and 12D illustrate ejection data of the cyan (C) ink of from first scan to fourth scan in FIG. 8.

FIGS. 13A, 13B, 13C and 13D illustrate ejection data of the magenta (M) ink of from first scan to fourth scan in FIG. 8.

FIGS. 14A, 14B, 14C and 14D illustrate ejection data of the cyan (C) ink and the magenta (M) ink of from first scan to fourth scan in FIG. 8.

FIG. 15 illustrates scan numbers upon completion of image formation corresponding to the ejection data from FIGS. 14A, 14B, 14C and 14D.

FIG. 16 illustrates data with "1" added to the data (numerals) in FIG. 15.

FIG. 17 illustrates data of a logical sum of the ejection pattern in FIG. 10 and the data in FIG. 16.

FIGS. 18A, 18B, 18C, 18D and 18E illustrate coating liquid ejection data of from first scan to fifth scan in FIG. 8.

FIGS. 20A, 20B, 20C and 20D illustrate random masks C resolving the ejection data of the cyan (C) ink.

FIGS. 21A, 21B, 21C and 21D illustrate a random masks M resolving the ejection data of the Magenta (M) ink.

FIG. 22 illustrates a random mask corresponding to the sum of the random mask C of the fourth scan in FIG. 20D and the random mask M of the fourth scan in FIG. 21D.

FIGS. 23A and 23B illustrate random masks for the coating liquid ejection data in the fourth scan and fifth scan.

FIGS. 24A, 24B, 24C, 24D and 24E illustrate coating liquid ejection data of from first scan to fifth scan in FIG. 19.

DESCRIPTION OF THE EMBODIMENTS

The present invention will hereinafter be described in more detail by the preferred embodiments of the invention.

The present inventors have carried out an investigation with a view toward effectively inhibiting the occurrence of a scratch caused by scratching or the like without impairing the image quality of an image formed on glossy paper with a pigment ink, i.e., without impairing the feel of a recorded matter, thus leading to completion of the present invention. The scratch resistance of an image formed with a pigment ink (hereinafter may be referred to as "an ink") and the constitution of a coating liquid will hereinafter be described.

<Scratch Resistance of Image Formed with Ink>

Figure 1:
FIG. 1 typically illustrates a section of an image formed on glossy paper with a pigment ink.

The occurrence of a scratch on an image formed on glossy paper with an ink, which is the greatest problem in the present invention, will hereinafter be described. FIG. 1 typically illustrates a section of the image formed on the glossy paper with the ink. In FIG. 1, an ink receiving layer 1-1 of the glossy paper and a pigment layer 1-2, i.e., the image formed with the ink, are illustrated.

When an image is formed on glossy paper with an ink, a pigment cannot penetrate into the interior of an ink receiving layer because the voids in the ink receiving layer are smaller than the particle size of the pigment as described above. Therefore, the pigment layer, i.e., the image is formed on the surface of the ink receiving layer as illustrated in FIG. 1. When the image in such a state is scratched, external force is directly applied to the pigment layer forming the image to easily cause a scratch. In fact, there is a possibility that those having a wide variety of materials and shapes may come into contact with the image, so that the level of the scratch resistance in conventional recorded matters may be insufficient in some cases taking into consideration the situation that the recorded matters are actually used.

In view of the above respect, the present inventors have carried out an investigation on the aspect that a damage of an image become great when what frictional body comes into contact with a recorded matter prepared with an ink in what way upon actual use of the recorded matter. As a result, it has been found that the damage of the image becomes extremely great when the recorded matter comes into "contact with a nail" in the course of handling of the recorded matter by, for example, rounding the recorded matter or sticking it on a wall.

The present inventors have carried out a further investigation as to the condition of the damage caused on the image when the nail comes into contact with the recorded matter. As a result, it was found that only a pigment layer might be peeled off from the glossy paper in some cases. In this case, only the pigment layer peels off at a portion where the nail comes into contact with the recorded matter, and the surface of the glossy paper is exposed, so that the scratch is extremely conspicuous, which causes a great problem. Incidentally, a scratch also occurs on an image when a frictional body harder than the nail, such as a metal, comes into contact. In such a case, however, the scratch extends to not only the image but also the glossy paper, which is considered to exceed the level when the actual use is assumed.

The present inventors have thus carries out an investigation as to a frictional body giving a scratch comparable to a scratch caused by a nail for quantitatively evaluating scratch resistance when the nail comes into contact with a recorded matter. As a result, it has been found that when polymethyl methacrylate (PMMA) is used as a frictional body, almost the same condition as the scratch by the nail is created.

Figure 2:
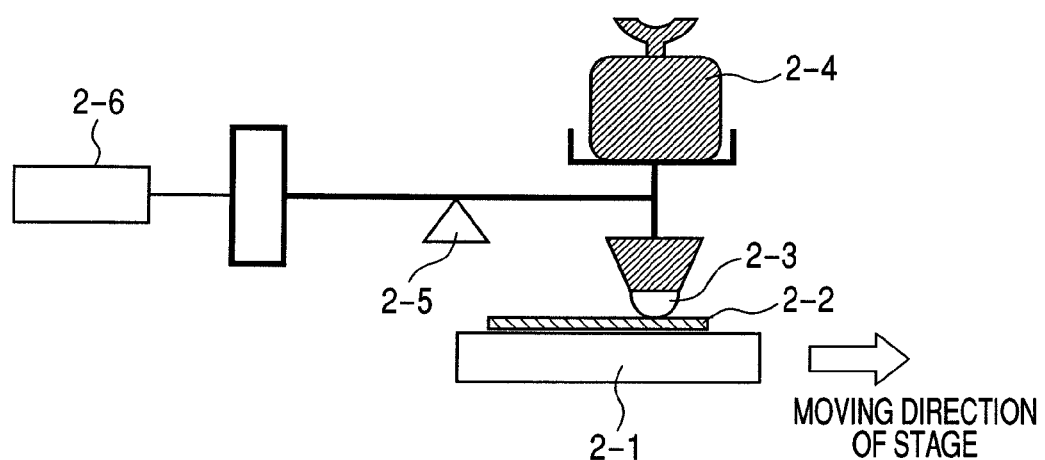
FIG. 2 typically illustrates the concept of a scratch resistance test.

The outline of a scratch resistance test using PMMA as a frictional body is as follows. FIG. 2 typically illustrates the scratch resistance test. From the viewpoint of reproducibility of the evaluation of the scratch resistance, it is preferable to use a PMMA ball (fractional body 2-3), by which the contact of an image with the frictional body is stabilized. A surface property tester is used to bring the PMMA ball (fractional body 2-3), to which a load has been applied from above, into vertical contact with the image, and a sample 2-2 on a movable stage 2-1 is moved at a predetermined speed to cause a scratch.

The mass of a fitting for fixing the fractional body 2-3 is removed by a balance mechanism 2-5. The scratch resistance of the image is evaluated by a vertical load (weight 2-4) applied to the image. Force in a horizontal direction, which acts on the fractional body 2-3 upon the movement of the stage, can be measured through a load cell 2-6 connected to the fitting. Incidentally, in Examples, which will be described subsequently, a surface property tester (trade name: HEIDON TRIBOGEAR TYPE 14DR; manufactured by SHINTO SCIENTIFIC CO., LTD.) was used as a method for the scratch resistance test. However, the present invention is not limited to the above-described apparatus, and any other apparatus may be used so far as like driving is possible.

The present inventors have carried out an extensive investigation as to the scratch resistance of a recorded matter obtained by forming a coating layer on an image formed on glossy paper with an ink using the above-described testing method of the scratch resistance. As a result, it has been clarified that when the following coating layer is formed by a coating liquid according to the present invention, improving scratch resistance and making the best use of the feel of the recorded matter can be achieved at the same time.

Figure 3:
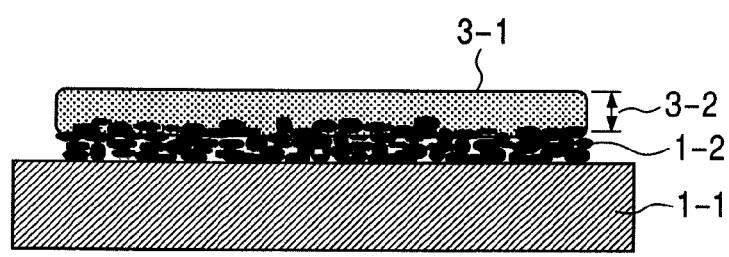
FIG. 3 typically illustrates a section of a recorded matter, an image on which a coating layer has been formed.

The preferable mode of a section of a recorded matter with a coat layer formed by the coating liquid of the present invention will be described. FIG. 3 typically illustrates a section of a recorded matter with a coating layer 3-1 formed on the pigment layer 1-2. It has been found that in order to improve the scratch resistance of the pigment layer 1-2, it is extremely effective to form the coating layer 3-1 on the pigment layer 1-2 to thereby lower the coefficient of kinetic friction of the coating layer to the PMMA ball previously described.

In the present invention, it is necessary to lower the coefficient of kinetic friction ($\mu k$) of the coating layer to 0.40 or less when the coating layer is formed on the pigment layer 1-2. The reason for it is that a recorded matter little in peeling-off of an image and occurrence of a scratch caused by contact of a nail can be obtained by lowering the coefficient of kinetic friction ($\mu k$) to 0.40 or less. On the other hand, if the coefficient of kinetic friction ($\mu k$) is more than 0.40, a scratch may be liable to occur on the image in some cases. In the present invention in particular, the coefficient of kinetic friction of the coating layer is more preferably 0.30 or less. The lower limit of kinetic friction is 0.00 or more.

The film strength of the coating layer formed on the image is also important. A coating layer low in film strength easily causes plastic deformation by application of external force to easily cause a scratch. The plastic deformation means such a deformation that a form is not restored to its original form after the external force is removed. On the contrary, such a deformation that a form is restored to its original form after the external force is removed is elastic deformation. A Young's modulus (E) may be mentioned as a material parameter indicating the deformation strength against the external force. The Young's modulus (E) is defined by the gradient of a quantity ($\Delta L$) of elastic deformation to external force (F) per unit volume. Since the greatest external force permitting the elastic deformation to external force becomes higher as this Young's modulus increases, the occurrence of a scratch is lessened.

The Young's modulus of a thin film like the coating layer in the present invention can be measured by a method of indentation test with ultrafine diamond indenter as a nanoindentation method. In Examples, which will be described subsequently, the Young's modulus was measured by means of a Nanoindenter XP (trade name; manufactured by MTS). However, the present invention is not limited to the above-described device, and any other device may also be used.

In the present invention, the Young's modulus (E: GPa (gigapascal)) of the coating layer measured by the nanoindentation method is preferably 1.5 GPa or more, more preferably 2.0 GPa or more. If the Young's modulus is less than 1.5 GPa, a scratch may be caused in some cases even by faint contact like contact of a coating layer with a back surface of a recording medium. The contact with the back surface of the recording medium is extremely small compared with scratching external force by a nail, which has been previously described, and to easily cause a scratch by such faint contact is a great problem.

In the present invention, the coating layer 3-1 is preferably formed so as to have a film thickness 3-2 of from 0.10 µm or more to 1.0 µm or less in at least a part thereof. Incidentally, the details of a method for controlling the film thickness 3-2 of the coating layer will be described subsequently at the description of the ink jet recording method. The film thickness 3-2 of the coating layer is a thickness of the film formed on the pigment layer 1-2 and may be measured by, for example, observing a section of the recorded matter through an atomic force microscope. The film thickness may also be measured by measuring the level difference between a region in which the coating layer is formed and a region in which no coating layer is formed by means of a surface roughness meter such as an atomic force microscope.

If the film thickness 3-2 of the coating layer exceeds 1.0 µm, the feel of the resulting recorded matter may be impaired in some cases, which is mainly caused by a glittering feel due to smoothening of a surface by increasing the film thickness of a coating layer at a portion to which a coating liquid has been applied.

If the film thickness of the coating layer is less than 0.10 µm, the effect to improve the scratch resistance may not be sufficiently achieved in some cases by the influence of irregularities in the surface of the pigment layer 1-2. The pigment layer 1-2 mainly formed by pigment particles is considered to form irregularities equivalent to the particle size of the pigment particles in its surface. As described above, the particle size of the pigment in the pigment ink is about 100 nm, i.e., about 0.10 µm. If the film thickness is less than 0.10 µm, the film thickness of the coating layer 3-1 becomes less than the irregularities in the surface of the pigment layer 1-2, so that a region in which the pigment layer cannot be coated with the coating layer 3-1 extremely increases, and so the effect to improve the scratch resistance may not be achieved in some cases.

<Coating Liquid>

Respective components making up the coating liquid according to the present invention will hereinafter be described. The coating liquid according to the present invention essentially contains at least a slippery compound, water and a water-soluble organic solvent.

As a result of an investigation by the present inventors, it has been found that it is very important to suitably select the slippery compound contained in the coating liquid for forming the coating layer for the purpose of obtaining a recorded matter having sufficient scratch resistance even when a nail comes into contact. Thus, various kinds of materials have been investigated. As a result, the present invention has been led to completion.

Incidentally, the coating liquid and coating layer according to the present invention are preferably substantially colorless and transparent, i.e., are colorless and have transparency within such a limit as not to lower the image quality. Specifically, the coating liquid is preferably made up in such a manner that the difference between an image density of a recorded matter to which the coating liquid has been applied and an image density of a recorded matter to which no coating liquid has been applied is 0.3 or less, more preferably 0.1 or less. The image density can be measured by a reflection densitometer. In Examples, which will be described subsequently, the image density was measured by means of a reflection densitometer (manufactured by X-Rite). However, the present invention is not limited to the above-described device, and any other device may also be used.

(Slippery Compound)

The slippery compound used in the coating liquid according to the present invention may be any compound so far as the compound permits the surface of a coating layer formed by using the coating liquid to have a coefficient of kinetic friction ($\mu k$) of 0.40 or less. As a result of an investigation by the present inventors, it has been found that the coefficient of kinetic friction of the coating layer can be particularly markedly lowered by using a coating liquid containing a polydimethylsiloxane type compound as the slippery compound. Hereinafter the slippery compound will be described in detail by taking the polydimethylsiloxane type compound, which is preferable in the present invention, as an example.

A general polydimethylsiloxane type compound has a polydimethylsiloxane segment represented by the following structural formula (1). The polydimethylsiloxane type compound has such a feature that its polarity is extremely low because the compound has a structure in which methyl groups (—$CH_3$) are bonded to the surroundings of a siloxane bond chain (Si—O—Si).

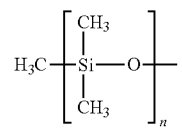

Structural formula (1)

Although the polydimethylsiloxane type compound is often liquid at ordinary temperature, its flowability varies from a non-viscous state like water to a thick malt syrup-like state according to the number of repeated (Si—O—Si) units. In general, a substance is more stable as its surface energy is lower. Therefore, the polydimethylsiloxane type compound having flowability transfers to a surface of the substance or an interface with the substance and localizes at the surface or interface and the vicinity thereof. As a result, it is considered that the surface energy of the coating layer is lowered, and so the frictional force between the coating layer and the polymethyl methacrylate (PMMA) ball is weakened, i.e., the coefficient of kinetic friction can be markedly lowered.

The physical properties of the polydimethylsiloxane type compound represented by the structural formula (1), such as flowability and solubility in water, can be controlled by, for example, modifying the polydimethylsiloxane segment. Examples of the polydimethylsiloxane type compound usable in the present invention include polydimethylsiloxane-modified resins, and silicone oils (liquid or semisolid polydimethylsiloxane type compounds). The kinds of the preferable polydimethylsiloxane type compounds and preferable constitutions of the coating liquid according to those will hereinafter be described.

[Polydimethylsiloxane-Modified Resin]

The present inventors have found that the coefficient of kinetic friction of the coating layer can be effectively reduced by using a polydimethylsiloxane-modified resin as the polydimethylsiloxane type compound. Hereinafter an embodiment of the coating liquid using the polydimethylsiloxane-modified resin as the polydimethylsiloxane type compound.

In order to form a coating layer on an image formed with an ink, it is preferable that the polydimethylsiloxane-modified resin is present as particles in the coating liquid, i.e., the polydimethylsiloxane-modified resin is present in a state having a particle size in the coating liquid. In other words, the 50% cumulative volume average particle size ($D_{50}$) of a polydimethylsiloxane-modified resin is preferably more than 0 nm. Further, the present inventors have carried out an investigation as to the relation between the average particle sizes of various polydimethylsiloxane-modified resins and coating layers formed. As a result, it has been found that the 50% cumulative volume average particle size ($D_{50}$) of a polydimethylsiloxane-modified resin is preferably 300 nm or less. If the 50% cumulative volume average particle size ($D_{50}$) of a polydimethylsiloxane-modified resin is more than 300 nm, the glossiness of an image formed may be lowered in some cases because of its too large particle size, thereby impairing the feel of a recorded matter though a coating layer can be formed on a pigment layer. Collectively, the 50% cumulative volume average particle size ($D_{50}$) of a polydimethylsiloxane-modified resin is preferably more than 0 nm and 300 nm or less in this embodiment.

The 50% cumulative volume average particle size ($D_{50}$) of a polydimethylsiloxane-modified resin is also more preferably 20 nm or more. The reason for it is that if the 50% cumulative volume average particle size ($D_{50}$) of a polydimethylsiloxane-modified resin is smaller than 20 nm, it may be difficult in some cases to efficiently form a coating layer on a pigment layer. This reason will hereinafter be considered.

As illustrated in FIG. 1, the pigment layer formed on the glossy paper with ink is in a state having a great number of pores because pigment particles are deposited on the ink receiving layer of the glossy paper. The pigment in the ink is generally present as particles having a particle size of about 100 nm, and so the size of the pores is considered to be several tens nanometers. If the polydimethylsiloxane-modified resin in the coating liquid is present in a state having no particle size, i.e., in a state dissolved in the coating liquid, the polydimethylsiloxane-modified resin applied on to the pigment layer may penetrate into the interior of the pigment layer in some cases. Therefore, it is considered that difficulties may be encountered on the formation of the coating layer on the pigment layer in some cases. On the other hand, when the polydimethylsiloxane-modified resin in the coating liquid is present in a state having a particle size, i.e., the 50% cumulative volume average particle size ($D_{50}$) thereof is more than 0, the penetration of the polydimethylsiloxane-modified resin applied on to the pigment layer into the interior of the pigment layer is inhibited. It is considered that when the 50% cumulative volume average particle size ($D_{50}$) is 20 nm or more at this time, a coating layer can be efficiently formed on the pigment layer even when the amount of the coating layer applied is small.

Incidentally, the 50% cumulative volume average particle size ($D_{50}$) can be measured by means of a particle size distribution meter. In Examples, which will be described subsequently, the 50% cumulative volume average particle size ($D_{50}$) was measured by means of Nanotrac UPA-150 (trade name; manufactured by NIKKISO). However, the present invention is not limited to the above-described apparatus, and any other apparatus may be used.

The glass transition temperature ($T_g$) of the polydimethylsiloxane-modified resin is preferably 20° C. or more. If the glass transition temperature of the polydimethylsiloxane-modified resin is lower than 20° C., a coating layer formed may have a tacky feel in some cases even at ordinary temperature. Since the polydimethylsiloxane-modified resin has flowability at a temperature not lower than its glass transition temperature, the coating layer also has tackiness. As a result, if the polydimethylsiloxane-modified resin whose grass transition temperature ($T_g$) is lower than 20° C., even in the ordinary temperature the tacky feel may be caused. The glass transition temperature ($T_g$) of the polydimethylsiloxane-modified resin is preferably 100° C. or less. If the glass transition temperature of the polydimethylsiloxane-modified resin exceeds 100° C., the film structure of the coating layer becomes hard to increase its fragility, so that the coating layer may be liable to cause fine cracks in some cases by deforming a recorded matter produced, for example, rounding it. Accordingly, the glass transition temperature ($T_g$) of the polydimethylsiloxane-modified resin is preferably from 20° C. or more to 100° C. or less. The glass transition temperature ($T_g$) of the polydimethylsiloxane-modified resin is more preferably 40° C. or more taking various environments under which the recorded matter produced is used into consideration. Incidentally, the glass transition temperature of the polydimethylsiloxane-modified resin can be controlled by suitably selecting the monomers making up the polydimethylsiloxane-modified resin.

The glass transition temperature can be measured by means of a differential scanning calorimeter (DSC). In Examples, which will be described subsequently, the glass transition temperature was measured by means of an EXSTAR-DSC6200S (trade name; manufactured by SII Nanotechnology). However, the present invention is not limited to the above-described instrument, and any other instrument may also be used.

The molecular weight of the polydimethylsiloxane-modified resin is preferably from 5,000 or more to 200,000 or less in terms of weight average molecular weight (Mw) when converted into polystyrene because the strength of the coating layer is greatly affected by the degree of entanglement of the molecular chains of the polydimethylsiloxane-modified resin. If the weight average molecular weight of the polydimethylsiloxane-modified resin is less than 5,000, the strength of the coating layer may be greatly lowered in some cases. Therefore, a scratch may be caused in some cases even by such a faint contact that a recorded surface of a recorded matter previously produced comes into contact with a back surface of a recorded matter next produced when a plurality of recorded matters is produced. In other words, the scratch resistance may not be sufficiently achieved in some cases. If the weight average molecular weight of the polydimethylsiloxane-modified resin is more than 200,000, there is a tendency for the particle size distribution and 50% cumulative volume average particle size of such a polydimethylsiloxane-modified resin to become great. At this time, the glossiness of an image formed may be lowered in some cases because of its too great 50% cumulative volume average particle size ($D_{50}$), thereby impairing the feel of a recorded matter though a coating layer can be formed on a pigment layer like the case where the 50% cumulative volume average particle size ($D_{50}$) is more than 300 nm.

The content (% by mass) of the polydimethylsiloxane-modified resin in the coating liquid is preferably from 1.0% by mass or more to 20.0% by mass or less, more preferably from 2.0% by mass or more to 10.0% by mass or less, in terms of the solid content based on the total mass of the coating liquid. If the content is less than 1.0% by mass, a coating layer having a film thickness of 0.10 μm or more may not be formed on the pigment layer in some cases. If the content exceeds 20.0% by mass, the feel of the resulting recorded matter may be impaired in some cases.

Polydimethylsiloxane-modified resins usable in this embodiment include copolymers having a polydimethylsiloxane segment, particularly such as an acrylic resin, urethane resin or polyester resin which is modified with polydimethylsiloxane may be used.

Methods for introducing the polydimethylsiloxane segment into these resins include the following method. For example, a polymerizable polydimethylsiloxane obtained by introducing a functional group polymerizable with another monomer into a terminal of a polydimethylsiloxane is used, and this polydimethylsiloxane is copolymerized with another monomer, whereby a polydimethylsiloxane-modified resin can be produced.

Examples of the polydimethylsiloxane having a polymerizable functional group include a mono terminal type that has a functional group at one terminal of the polydimethylsiloxane and a bi terminal type that has a functional group at both terminals of the polydimethylsiloxane. A commercially available modified polydimethylsiloxane having an amino group, hydroxyl group, acryloyl group or methacryloyl group as the functional group may also be used. Examples of such modified polydimethylsiloxanes include MONO TERMINAL SILAPLANE and BI TERMINAL SILAPLANE (both, trade names; products of Chisso Corporation).

In this embodiment, a polydimethylsiloxane-modified resin containing a modified polydimethylsiloxane of the mono terminal type is particularly preferably used because the effect to lower the coefficient of kinetic friction of the coating layer is great. When a modified polydimethylsiloxane of the bi terminal type is used, the modified polydimethylsiloxane segment is incorporated into a main chain of a polymer. On the other hand, when the modified polydimethylsiloxane of the mono terminal type is used, the modified polydimethylsiloxane segment is introduced in a grafted state into a main chain of a polymer. As described above, the polydimethylsiloxane segment introduced in the grafted state into the main chain of the polymer becomes high in the degree of steric freedom compared with the case where the segment is introduced into the main chain of the polymer, so that a locally orienting tendency to the surface of the coating layer becomes higher, and so the effect to improve the scratch resistance is more enhanced.

The weight average molecular weight of the modified polydimethylsiloxane segment in the polydimethylsiloxane-modified resin is preferably from 1,000 or more to 30,000 or less. If the weight average molecular weight of the modified polydimethylsiloxane segment is less than 1,000, the above-described graft effect of the modified polydimethylsiloxane segment is not exhibited, and so sufficient scratch resistance may not be achieved in some cases. If the weight average molecular weight of the modified polydimethylsiloxane segment is more than 30,000, its copolymerizability with another monomer is lowered, and the stability of the resulting polydimethylsiloxane-modified resin and the stability of a coating liquid containing such a segment may be lowered in some cases. Incidentally, the weight average molecular weight of the modified polydimethylsiloxane segment almost corresponds to the number n of repeated dimethylsiloxane chains in the structural formula (1). When the weight average molecular weight is 1,000, n is about 13, while n is about 400 when the weight average molecular weight is 30,000. In this embodiment, n is preferably from 13 or more to 400 or less.

The content (copolymerization quantity) of the modified polydimethylsiloxane segment in the polydimethylsiloxane-modified resin can be determined in view of the performance of the coating layer. However, care is required because the film strength of the coating layer may be lowered in some cases with the increase in the content (copolymerization quantity) of the modified polydimethylsiloxane segment. The reason for it is that the polydimethylsiloxane segment is extremely low in polarity from its molecular structure, and the cohesion of the molecular chains of the polydimethylsiloxane-modified resin is lowered with the increase of this content, and so sufficient film strength for the coating layer may not be retained in some cases.

Accordingly, the content (copolymerization quantity) of the modified polydimethylsiloxane segment making up the polydimethylsiloxane-modified resin is preferably 40.0% by mass based on the total mass of the monomers making up the polydimethylsiloxane-modified resin. On the other hand, when the content of the modified polydimethylsiloxane segment is low, the coefficient of kinetic friction of the coating layer may become high in some cases though it varies according to the kind of the polydimethylsiloxane-modified resin formed. In order to keep the coefficient of kinetic friction of the coating layer to 0.40 or less, the content (copolymerization quantity) of the modified polydimethylsiloxane segment is preferably 5.0% by mass or more based on the total moss of the monomers making up the polydimethylsiloxane-modified resin.

Examples of the monomer copolymerizable with the modified polydimethylsiloxane segment include the following monomer. Methyl(meth)acrylate, ethyl(meth)acrylate, n-butyl(meth)acrylate, isobutyl(meth)acrylate, n-hexyl(meth)acrylate, cyclohexyl(meth)acrylate, n-octyl(meth)acrylate, isooctyl(meth)acrylate, 2-ethylhexyl(meth)acrylate, isononyl(meth)acrylate, lauryl(meth)acrylate, stearyl(meth)acrylate, acrylic acid, methacrylic acid, crotonic acid, maleic acid, fumaric acid, itaconic acid, (meth)acryloyloxyethylsulfonic acid, hydroxyethyl(meth)acrylate, hydroxypropyl(meth)acrylate, hydroxybutyl(meth)acrylate, methoxyethyl(meth)acrylate, ethoxyethyl(meth)acrylate, polyethylene glycol mono(meth)acrylate, polypropylene glycol mono(meth)acrylate, tetrahydrofurfuryl(meth)acrylate, phenoxyethyl(meth)acrylate, benzyl(meth)acrylate, glycidyl(meth)acrylate, (meth)acrylamide, N-methylol(meth)acrylamide, dialkylethyl(meth)acrylates, styrene and styrene derivatives such as vinyltoluene, vinylbenzoic acid, α-methylstyrene, p-hydroxymethylstyrene and styrenesulfonic acid, and vinyl ethers and derivatives thereof such as methyl vinyl ether, butyl vinyl ether, methoxyethyl vinyl ether, N-vinylpyrrolidone, 2-vinyloxazone and vinylsulfonic acid. Incidentally, in the present invention, "(meth)acryl" means both "acryl" and "methacryl", and "(meth)acrylate" means both "acrylate" and "methacrylate".

The polydimethylsiloxane-modified resin usable in this embodiment may be any resin so far as the image quality of an image to which the coating liquid has been applied, such as color developability and texture, is equivalent or superior to an image to which no coating liquid has been applied. In this embodiment, among the above-monomers, a polydimethylsiloxane-modified acrylic resin obtained by copolymerizing the polydimethylsiloxane and an acrylic monomer, i.e., an acrylsilicone copolymer, is particularly preferably used because its glass transition temperature and properties such as hydrophilicity/hydrophobicity are easy to be controlled.

The acrylsilicone copolymer can be prepared by, for example, a modified polydimethylsiloxane segment having an acryloyl group or methacryloyl group at its terminal as a functional group and a polymerizable monomer having one or more unsaturated polymerizable functional groups. As the modified polydimethylsiloxane having the acryloyl group or methacryloyl group at its terminal as the functional group, may be used a commercially available one. Examples of such a modified polydimethylsiloxane include mono terminal methacryloxy-modified polydimethylsiloxane (trade names: MONO TERMINAL SILAPLANE FM-071, average molecular weight of the polydimethylsiloxane segment: 5,000; product of Chisso Corporation).

As processes for synthesizing a polydimethylsiloxane-modified resin using such a modified polydimethylsiloxane, may be mentioned, for example, the following processes. A process in which the above-described monomers is subjected to emulsion polymerization in water, a process in which the monomers are subjected to solution polymerization in an organic solvent, and the resultant polymer is then subjected to phase inversion and emulsified, and a process in which an acid or base is applied to the polydimethylsiloxane-modified resin, and self-emulsification is then conducted by neutralization. A dispersion liquid obtained by dispersing the polydimethylsiloxane-modified resin in an aqueous medium may be prepared by dispersing the polydimethylsiloxane-modified resin synthesized by any of the above-described synthetic processes in the aqueous medium. However, a commercially available dispersion liquid may also be used.

[Silicone Oil]

The present inventors have found that even when a silicone oil is used as the polydimethylsiloxane type compound and a coating liquid further containing a resin for imparting a film-forming property to the coating liquid is used, the coefficient of kinetic friction of a coating layer can be effectively reduced. Hereinafter an embodiment of the coating liquid containing the silicone oil as the polydimethylsiloxane type compound and a resin (hereinafter referred to as a resin) having a film-forming property will be described in detail.

The present inventors presume such a mechanism that the coating layer having a markedly low coefficient of kinetic friction can be formed on the pigment layer by applying the coating liquid containing the silicone oil and the resin in combination to the image to be as follows. The silicone oil is easy to penetrate into the pigment layer which is in a state having a great number of pores, because the oil has high flowability and is liquid at ordinary temperature. Therefore, when the coating liquid contains the silicone oil alone without containing the resin, it may be difficult in some cases to improve the scratch resistance of the resulting recorded matter.

On the other hand, when the coating liquid containing the silicone oil and the resin in combination is applied to the image, the resin forms a coating layer on the pigment layer, and so the silicone oil cannot penetrate into the pigment layer and stays in the coating layer. Since the silicone oil present in the coating layer is low in the surface energy thereof as described above, the silicone oil transfers to the surface of the coating layer and the vicinity thereof and localizes. As a result, the coating layer high in slip properties is formed on the pigment layer. Since the coating layer formed in such a manner is markedly low in coefficient of kinetic friction, the scratch resistance of the recorded matter can be greatly improved.

The silicone oil is a polydimethylsiloxane type compound that is liquid or semisolid at ordinary temperature and generally has a structure represented by the following structural formula (2).

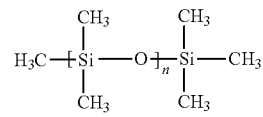

Structural formula (2)

Since the coating liquid according to the present invention contains an aqueous medium containing water and an water-soluble organic solvent, which is hence an aqueous coating liquid, a silicone oil emulsified and dispersed in the aqueous medium or a water-soluble silicone oil into which a functional group high in affinity for the aqueous medium has been introduced, is particularly preferably used. The water-soluble silicone oil is also preferably used from the viewpoint of stability of the coating liquid, and polyalkylene oxide-modified silicone oil is particularly preferably used. As the polyalkylene oxide-modified silicone oil, may be used the following oil. Specific examples thereof include polyethylene oxide-modified silicone oil, polyethylene-propylene oxide-modified silicone oil and co-modified silicone oil made up of a long-chain alkyl group and a polyalkylene oxide group.

When the coating liquid according to this embodiment is ejected by an ink jet system, the coating liquid is preferably provided as a coating liquid that is little in sticking in the vicinity of an ejection orifice, i.e., has excellent sticking resistance. When the coating liquid according to this embodiment is ejected by an ink jet system in which the coating liquid is ejected by the action of thermal energy, it is preferable that change in nature of the silicone oil by heat can be inhibited, and sticking by dispersion breaking can be inhibited. For this reason, the polyalkylene oxide-modified silicone oil which is particularly excellent in the stability of the coating liquid is particularly preferably used.

In order to effectively lower the coefficient of kinetic friction of the coating layer, it is preferable to suitably determine the molecular weight of the silicone oil. Specifically, the weight average molecular weight of the silicone oil is preferably from 1,000 or more to 100,000 or less. If the weight average molecular weight is less than 1,000, the effect to lower the coefficient of kinetic friction becomes insufficient, and so excellent scratch resistance may not be achieved in some cases. The present inventors presume this reason to be due to the fact that the effect to lower the surface energy of the coating layer may not be sufficiently achieved in some cases because the weight average molecular weight of the silicone oil is low, i.e., the length of the polydimethylsiloxane chain is short. If the weight average molecular weight of the silicone oil is more than 100,000, the hydrophobicity of the silicone oil becomes extremely high. It may thus be difficult in some cases to apply such oil as a material making up an aqueous coating liquid like the coating liquid according to the present invention, and the flowability of the silicone oil may be lowered in some cases. Such silicone oil is hence not preferable from the viewpoint of achieving the effects of the present invention.

The ratio B/A of the content B (% by mass) of the silicone oil to the content A (% by mass) of the resin based on the total mass of the coating liquid is preferably more than 0 and 1.0 or less, i.e., satisfies the relation of the following expression (1), $$0 < B/A \leq 1 \qquad (1)$$

When the ratio B/A exceeds 0, the coefficient of kinetic friction of the coating layer can be easily lowered to greatly improve the scratch resistance of the recorded matter. On the other hand, if the content of the silicone oil is relatively low compared with the content of the resin, specifically the ratio B/A comes too close to 0, sufficient slip properties cannot be imparted to the coating layer, and so it may be difficult in some cases to improve the scratch resistance of the recorded matter. If the ratio B/A exceeds 1.0, the amount of the silicone oil present in the interior of the coating layer becomes relatively great compared with the resin, and the cohesion of the molecular chains forming the coating layer becomes small, so that the strength of the coating layer may not be sufficiently achieved in some cases. In this embodiment, the ratio B/A is particularly preferably from 0.3 or more to 1.0 or less.

As described above, when the silicone oil is used as the polydimethylsiloxane type compound, it is preferable to further use the resin in combination. In this embodiment, a water-soluble resin is particularly preferably used from the viewpoint of the transparency of the image to which the coating layer has been applied. Since the water-soluble resin is dissolved in the aqueous medium at a molecular level, the coating liquid containing such a resin is excellent in stability. Therefore, even when the coating liquid according to this embodiment is ejected by an ink jet system, the coating liquid causes little sticking in the vicinity of an ejection orifice, i.e., has excellent sticking resistance. Even when the coating liquid according to this embodiment is ejected by an ink jet system in which the coating liquid is ejected by the action of thermal energy, the coating liquid is also excellent in ejection stability. The reason for it is that since the resin is dissolved in the aqueous medium at a molecular level, the occurrence of kogation attributing to the deposition of the resin caused by breaking-up of the resin-dissolved state is little, and consequently the coating liquid can be stably ejected. Incidentally, the condition that the resin is soluble in water in this embodiment means that the resin has no particle size when the particle size is measured on a liquid containing such a resin by, for example, a dynamic light scattering method.

However, the water-soluble resin may be relatively low in the performance of forming a coating layer in some cases compared with a water-insoluble resin. The present inventors presume this reason to be attributable to the fact that since the water-soluble resin is dissolved in the aqueous medium at the molecular level, the resin penetrates in the interior of the pigment layer having pores together with the aqueous medium without being fixed on to the pigment layer. When such a water-soluble resin as to penetrate in the interior of the pigment layer is used as described above, it may be difficult in some cases to form the coating layer on the pigment layer because the silicone oil may also penetrate in the interior of the pigment layer together with the aqueous medium in some cases.

As a result of an investigation by the present inventors, it has been found that when the water-soluble resin is used as the resin in this embodiment, the following 2 conditions are preferably satisfied for forming a favorable coating layer on a pigment layer. First, it is preferable that the water-soluble resin is insolubilized when the coating liquid is applied to a recording medium, thereby being deposited on the pigment layer. If the water-soluble resin is not insolubilized, the water-soluble resin penetrates in the interior of the pigment layer together with the aqueous medium in the coating liquid, so that no coating layer may be formed in some cases. Next, it is preferable that the water-soluble resin has a stable film-forming ability after the water-soluble resin is insolubilized and deposited on the pigment layer. If the film-forming ability of the water-soluble resin is low, the water-soluble resin gradually penetrates in the interior of the pigment layer having pores with time, so that it may be difficult in some cases to retain the form of the coating layer. In this embodiment, when the water-soluble resin is used as the resin, the water-soluble resin particularly preferably has the following properties from these 2 conditions.

First, in order to insolubilize the water-soluble resin so as to be deposited on the pigment layer when the coating liquid is applied to the recording medium, it is preferable to use a resin having an acidic group as the water-soluble resin. Examples of the acidic group include a carboxyl group (—COOH), a sulfonic group (—SO$_3$H) and a phosphoric group (—PO$_4$H). In water-soluble resins having these acidic groups, the acidic groups form salts by being neutralized with a base, thereby becoming water-soluble. Accordingly, when the number of acidic groups that the water-soluble resin has is suitably determined, the water-solubility of the water-soluble resin can be suitably determined. The present inventors have found that when the number of acidic groups that the water-soluble resin has is suitably determined, such a water-soluble resin can be insolubilized and deposited on the pigment layer to form a coating layer on the pigment layer upon application of the coating liquid to the recording medium, though the water-soluble resin is present in a dissolved state in the coating liquid.

The number of acidic groups that the water-soluble resin has can be indicated by the acid value of the resin. In this embodiment, the acid value is preferably from 50 mg KOH/g or more to 250 mg KOH/g or less in terms an acid value when reduced to a neutralization equivalent with potassium hydroxide per gram of the water-soluble resin. If the acid value exceeds 250 mg KOH/g, the water-solubility of such a water-soluble resin becomes extremely high, so that the water-soluble resin may penetrate into the pigment layer without being insolubilized in some cases when the coating liquid is applied to the recording medium, thereby failing to form the coating layer. If the acid value is too high, the water fastness of the image after the coating layer is dried may be markedly lowered in some cases, so that the acid value of the water-soluble resin is more preferably 150 mg KOH/g or less. If the acid value of the water-soluble resin is less than 50 mg KOH/g, such a water-soluble resin may not be dissolved in the aqueous medium making up the coating layer in some cases.

The present inventors presume the following as the mechanism with which the number of acidic groups that the water-soluble resin has is suitably determined, whereby such a water-soluble resin can be insolubilized and deposited on the pigment layer to form the coating layer on the pigment layer when the coating liquid is applied to the recording medium to be as follows. A water-soluble resin, the acidic group of which is a salt type, is ionically dissociated in an aqueous medium to become an anionic type. For this reason, the solubility of the water-soluble resin is greatly affected by the proton (H$^+$) concentration and the concentration of a non-dissociating cation component in the aqueous medium making up the coating liquid. When the proton concentration in the aqueous medium becomes high, the ionization equilibrium of water is transferred to such a direction as to lower the proton concentration, so that the anionic type resin becomes a nonionic type and insolubilizes to deposit as fine particles in the aqueous medium.

Likewise, a cationic group is bonded to the anionic group of the water-soluble resin depending on the concentration of the non-dissociating cation component in the aqueous medium, so that the anionic type water-soluble resin becomes a nonionic type and insolubilizes to deposit as fine particles in the aqueous medium. The rate of insolubilization of the water-soluble resin by due to the conversion of the water-soluble resin to the nonionic type becomes low as the number of acidic groups that the water-soluble resin has increases. Accordingly, it is considered that when such change as described above occurs in the coating liquid containing the water-soluble resin, the acid value of the water-soluble resin is controlled, whereby the speed of insolubilization of the water-soluble resin can be controlled.

On the other hand, many of ink jet recording media are recording media containing a non-dissociating cation component, or recording media the pH of surfaces of which is set to the acid side (toward increasing the proton concentration) for the purpose of improving the fixing ability of an ink. When an ink is applied to such a recording medium, the ink is greatly affected by the non-dissociating cation component in the recording medium or the pH of the surface of the recording medium, thereby forming an image, i.e., a pigment layer. Accordingly, the water-soluble resin in the coating liquid applied to the recording medium is also greatly affected by the non-dissociating cation component in the recording medium or the pH of the surface of the recording medium, i.e., a proton, like the above. It is considered that fine particles are deposited by the insolubilization of the resin as previously described, and so the resin cannot penetrate into pores in the pigment layer, and a coating layer is thus formed on the pigment layer.

Next, in order for the water-soluble resin to have a stable film-forming property after the water-soluble resin is insolubilized and deposited on the pigment layer, it is preferable to suitably determine the glass transition temperature of the water-soluble resin. Specifically, the glass transition temperature of the water-soluble resin is preferably 20° C. or more. If the glass transition temperature is lower than 20° C., such a resin comes to have flowability at a temperature near to room temperature, so that it may be difficult in some cases to retain a stable coating layer, or the surface of the image may come to have a sticky feel in some cases. Since a resin generally comes to have flowability at a temperature not lower than its glass transition temperature, in some cases, deformation of the coating layer may occur, or the coating layer may come to have stickiness to cause a sticky feel on the surface of the image. In order for the recorded matter produced to have far excellent scratch resistance even under various environments in which the recorded matter is used, the glass transition temperature of the water-soluble resin is more preferably 40° C. or more.

On the other hand, the glass transition temperature of the water-soluble resin is preferably 100° C. or less. If the glass transition temperature of the water-soluble resin exceeds 100° C., the film structure of the coating layer becomes hard to increase fragility, so that the coating layer may be liable to cause fine cracks in some cases by deforming the recorded matter produced, for example, rounding it. Incidentally, the glass transition temperature of the water-soluble resin can be controlled by suitably selecting the monomers making up the water-soluble resin.

In order for the water-soluble resin to have the stable film-forming property after the water-soluble resin is insolubilized and deposited on the pigment layer, it is also preferable to suitably determine the molecular weight of the water-soluble resin in addition to the above-described glass transition temperature. Specifically, the molecular weight of the water-soluble resin is preferably from 5,000 or more to 200,000 or less in terms of weight average molecular weight (Mw) when converted into polystyrene because the strength of the coating layer is greatly affected by the degree of entanglement of the molecular chains of the water-soluble resin. If the weight average molecular weight of the water-soluble resin is less than 5,000, the strength of the coating layer may be greatly lowered in some cases. Therefore, a scratch may be caused in some cases even by such a faint contact that a recorded surface of a recorded matter previously produced comes into contact with a back surface of a recorded matter next produced when a plurality of recorded matters is produced. In other words, the scratch resistance may not be sufficiently achieved in some cases. If the weight average molecular weight of the water-soluble resin is more than 200,000, a coating liquid containing such a resin comes to have a high viscosity, so that it may be difficult in some cases to form a uniform coating layer. Incidentally, the above-described preferable ranges of glass transition temperature and average molecular weight can be applied to the resin having the film-forming property as well as the water-soluble resin.

As the resin having such properties as described above, any resin may be used so far as the water-soluble resin is insolubilized and deposited on the pigment layer when a coating layer containing such a resin is applied to a recording medium. In this embodiment, however, a substantially transparent resin is preferably used. Incidentally, the coating liquid containing the substantially transparent resin is a coating liquid made up in such a manner that the difference between image densities of a recorded matter to which the coating liquid has been applied, and a recorded matter to which no coating liquid has been applied, is 0.3 or less, more preferably 0.1 or less, as described above.

Specific examples of resins usable in this embodiment include acrylic resins, urethane resins, polyester resins and vinyl resins. In this embodiment, acrylic resins are particularly preferably used taking the stability of the coating liquid containing the resin and the degree of freedom of resin design into consideration. Incidentally, the resin can be synthesized by a known polymerization process such as radical polymerization using the following monomer(s).

Examples of monomers making up the resin of this embodiment include methyl(meth)acrylate, ethyl(meth)acrylate, n-butyl(meth)acrylate, isobutyl(meth)acrylate, n-hexyl(meth)acrylate, cyclohexyl(meth)acrylate, n-octyl(meth)acrylate, isooctyl(meth)acrylate, 2-ethylhexyl(meth)acrylate, isononyl(meth)acrylate, lauryl(meth)acrylate, stearyl(meth)acrylate, (meth)acrylic acid, crotonic acid, maleic acid, fumaric acid, itaconic acid, (meth)acryloyloxyethylsulfonic acid, hydroxyethyl(meth)acrylate, hydroxypropyl(meth)acrylate, hydroxybutyl(meth)acrylate, methoxyethyl(meth)acrylate, ethoxyethyl(meth)acrylate, polyethylene glycol mono(meth)acrylate, polypropylene glycol mono(meth)acrylate, tetrahydrofurfuryl(meth)acrylate, phenoxyethyl(meth)acrylate, benzyl(meth)acrylate, glycidyl(meth)acrylate, (meth)acrylamide, N-methylol(meth)acrylamide, dialkylethyl(meth)acrylates, styrene and styrene derivatives such as vinyltoluene, vinylbenzoic acid, α-methylstyrene, p-hydroxymethylstyrene and styrenesulfonic acid, and vinyl ethers and derivatives thereof such as methyl vinyl ether, butyl vinyl ether, methoxyethyl vinyl ether, N-vinylpyrrolidone, 2-vinyloxazone and vinylsulfonic acid.

The content A (% by mass) of the resin in the coating liquid is preferably from 1.0% by mass or more to 20.0% by mass or less based on the total mass of the coating liquid. If the content of the resin is less than 1.0% by mass, it may be difficult in some cases to form a uniform coating layer on the pigment layer when only a part of the resin penetrates in the interior of the pigment layer. If the content exceeds 20.0% by mass, the coating liquid containing such a resin comes to have a high viscosity, so that it may be difficult in some cases to uniformly apply the coating liquid to the recording medium.

(Aqueous Medium)

In all the embodiments as to the slippery compound as described above, it is essential to use an aqueous medium containing water and a water-soluble organic solvent in the coating liquid. The content (% by mass) of the water-soluble organic solvent in the coating liquid is preferably from 10.0% by mass or more to 50.0% by mass or less, more preferably from 15.0% by mass to 25.0% by mass based on the total mass of the coating liquid. The content (% by mass) of water in the coating liquid is preferably from 40.0% by mass or more to 85.0% by mass or less, more preferably from 50.0% by mass or more to 85.0% by mass or less, most preferably from 60.0% by mass to 80.0% by mass based on the total mass of the coating liquid.

Specific examples of usable water-soluble organic solvents include alkyl alcohols having 1 to 6 carbon atoms, such as methanol, ethanol, propanol, propanediol, butanol, butanediol, pentanol, pentanediol, hexanol and 1,2- or 1,6-hexanediol; polyhydric alcohols such as ethylene glycol, diethylene glycol, triethylene glycol, polyethylene glycol, polypropylene glycol, glycerol and hexanetriol; polyhydric alcohol ethers such as ethylene glycol monoethyl ether and ethylene glycol monobutyl ether; and amines such as ethanolamine and triethanolamine. Among these, glycerol, ethylene glycol and isopropyl alcohol (2-propanol) are particularly preferably used.

(Other Components)

The coating liquid according to the present invention may contain moisture-retaining solids such as urea, urea derivatives, trimethylolpropane and trimethylolethane in addition to the above-described components for keeping the moisture retention of the coating liquid. As needed, other components may be contained within an limit not impairing the objects and effects of the present invention for the purpose of providing a coating liquid having desired physical property values. For example, various additives such as surfactants, rust preventives, antifoaming agents, preservatives, mildewproofing agents, antioxidants, reduction-preventing agents, evaporation accelerators, viscosity modifiers, film-forming aids, dispersants (for example, resins) and ultraviolet absorbents may be contained.

As the surfactants, any of anionic surfactants, nonionic surfactants and ampholytic surfactants may be used so far as storage stability of the resulting coating liquid is not affected. Specifically, as the anionic surfactants, may be used fatty acid salts, salts of higher alcohol sulfuric esters, salts of liquid fatty oil sulfuric esters and alkylarylsulfonic acid salts. Specifically, as the nonionic surfactants, may be used polyoxyethylene alkyl esters, polyoxyethylene sorbitan alkyl esters, acetylene alcohol and acetylene glycol. The content (% by mass) of the surfactant is preferably from 0.10% by mass or more to 5.0% by mass or less based on the total mass of the coating liquid.

<Ink>

Respective components making up pigment inks usable in an ink jet recording method according to the present invention will hereinafter be described.

(Coloring Material)

As the coloring material, any pigment may be used so far as the pigment is a pigment used in a conventional ink. An average particle size of the pigment is preferably from 0.05 µm to 0.30 µm (from 50 nm to 300 nm), more preferably from 0.07 µm to 0.20 µm (from 70 nm to 200 nm) as a volume average particle size in the ink. The content (% by mass) of the pigment in the ink is preferably from 1.0% by mass or more to 20.0% by mass or less, more preferably from 2.0% by mass or more to 12.0% by mass or less, based on the total mass of the ink. A general dye may also be used as a coloring material in addition to the pigment.

In a black (K) ink, carbon black such as furnace black, lamp black, acetylene black or channel black is preferably used as the pigment. Specifically, for example, the following commercially available products may be used. Raven: 7000, 5750, 5000 ULTRA, 3500, 2000, 1500, 1250, 1200, 1190 ULTRA-II, 1170 and 1255 (all, products of Columbian Chemical Co.); Black Pearls L, Regal: 300R, 400R and 660R, Mogul L, Monarch: 700, 800, 880, 900, 1000, 1100, 1300, 1400 and 2000, Valcan XC-72R, and Sterling: MS and NSX76 (all, products of CABOT CO.); Color Black: FW1, FW2, FW2V, FW18, FW200, S150, S160 and S170, Printex: 35, U, V, 140U and 140V, and Special Black: 4, 4A, 5 and 6 (all, products of Degussa AG); and No. 25, No. 33, No. 40, No. 45, No. 47, No. 52, No. 900, No. 2200 B, No. 2300, MCF-88, MA7, MA8, MA100 and MA600 (all, products of MITSUBISHI CHEMICAL CORPORATION). Carbon black newly prepared for the present invention may also be used. Quite naturally, the present invention is not limited to these pigments, and any carbon black may be used. Magnetic fine particles such as magnetite and ferrite, and titanium black may also be used as pigments without being limited to the carbon black.

In color inks such as cyan (C), magenta (M) and yellow (Y) inks, organic pigments are preferably used. As the organic pigments, may be specifically used, for example, the following pigments. Water-insoluble azo pigments such as Toluidine Red, Toluidine Maroon, Hansa Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; indigo pigments; condensed azo pigments; thioindigo pigments; diketopyrrolopyrrole pigments; and besides Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet. Needless to say, the present invention is not limited to these pigments.

When organic pigments are indicated by COLOR INDEX (C.I.) numbers, for example, the following pigments may be used. C.I. Pigment Yellow: 1, 2, 3, 12, 13, 14, 16, 17, 20, 24, 74, 75, 83, 86, 93, 95, 97, 98, 109, 110, 114, 117, 120, 125, 128, 129, 137, 138, 147, 148, 150, 151, 153, 154, 166, 168, 180 and 185; C.I. Pigment Red: 5, 7, 9, 12, 48(Ca), 48(Mn), 49, 52, 53, 57(Ca), 97, 112, 122, 123, 149, 168, 175, 176, 177, 180, 184, 192, 202, 207, 215, 216, 217, 220, 223, 224, 226, 227, 228, 238, 240, 254, 255 and 272; C.I. Pigment Blue: 1, 2, 3, 4, 15, 15:1, 15:2, 15:3, 15:4, 15:6, 16, 22, 60 and 64; and C.I. Vat Blue: 4, 6, 19, 23 and 42. Needless to say, the present invention is not limited these pigments.

(Dispersant)

As a dispersant used for dispersing such a pigment as described above in an aqueous medium, any resin may be used so far as the resin is a water-soluble resin. Specifically, a dispersant used in an ink may be suitably selected in view of the dispersion stability and storage stability of the ink and ink jet properties such as ejection stability.

As the dispersant, may be used a hydrophilic resin obtained by copolymerizing two or more monomers (at least one thereof is a hydrophilic monomer) of the following monomers, or a salt thereof. Specific examples of the monomers include styrene, styrene derivatives, vinylnaphthalene, vinylnaphthalene derivatives and aliphatic alcohol esters of $\alpha,\beta$-ethylenically unsaturated carboxylic acids. Acrylic acid, acrylic acid derivatives, maleic acid, maleic acid derivatives, itaconic acid, itaconic acid derivatives, fumaric acid and fumaric acid derivatives may also be mentioned.

Dispersants exhibiting cationicity, such as acrylic copolymers obtained by a monomer quaternized with methyl chloride, dimethylsulfuric acid, benzyl chloride or epichlorohydrin, may also be used. Specific examples of such a monomer include N,N-dimethylaminoethyl methacrylate, N,N-dimethylamino-(meth)acrylamide and N,N-dimethylaminopropyl-(meth)acrylamide.

In the present invention, a water-soluble resin having a structure such as a block copolymer or graft copolymer is particularly preferably used as the dispersant. In these resins, a hydrophobic portion and a hydrophilic portion in its molecular structure are clearly separated from each other. Since such a resin exhibits strong adsorbability to hydrophobic pigments, the dispersibility of the pigment in the aqueous medium can be made very well.

(Aqueous Medium)

An aqueous medium containing water or water and a water-soluble organic solvent is preferably used in the ink. The content (% by mass) of the water-soluble organic solvent in the ink is preferably from 3.0% by mass or more to 50.0% by mass or less, more preferably from 3.0% by mass or more to 40.0% by mass or less, based on the total mass of the ink. The content (% by mass) of water is preferably from 10.0% by mass or more to 90.0% by mass or less, more preferably from 30.0% by mass or more to 80.0% by mass or less, based on the total mass of the ink.

For example, the following water-soluble organic solvents may be specifically used. Alkyl alcohols having 1 to 6 carbon atoms, such as methanol, ethanol, propanol, propanediol, butanol, butanediol, pentanol, pentanediol, hexanol, hexanediol and 1,2,6-hexanetriol; amides such as dimethylformamide and dimethylacetamide; ketones or keto-alcohols such as acetone and diacetone alcohol; ethers such as tetrahydrofuran and dioxane; polyalkylene glycols such as polyethylene glycol and polypropylene glycol; alkylene glycols having an alkylene group having 2 to 6 carbon atoms, such as ethylene glycol, propylene glycol, butylene glycol, triethylene glycol, thiodiglycol, hexylene glycol and diethylene glycol; alkyl ether acetate such as polyethylene glycol monomethyl ether acetate; glycerol; alkyl ethers of polyhydric alcohols, such as ethylene glycol monomethyl (or ethyl) ether, diethylene glycol methyl (or ethyl) ether and triethylene glycol monomethyl (or ethyl) ether; and N-methyl-2-pyrrolidone, 2-pyrrolidone and 1,3-dimethyl-2-imidazolidinone. Among the above-described solvents, polyhydric alcohols such as diethylene glycol, and alkyl ethers of polyhydric alcohols, such as triethylene glycol monomethyl (or ethyl) ether are preferably used.

(Other Components)

The ink may contain moisture-retaining solids such as urea, urea derivatives, trimethylolpropane and trimethylolethane in addition to the above-described components for keeping the moisture retention of the ink. The ink may further contain various components such as surfactants, rust preventives, antifoaming agents, preservatives, mildewproofing agents, antioxidants, reduction-preventing agents and evaporation accelerators, as needed, for the purpose of providing an ink having desired physical property values.

As the surfactants, any of anionic surfactants, nonionic surfactants and ampholytic surfactants may be used so far as storage stability of the resulting ink is not affected. Specifically, as the anionic surfactants, may be used fatty acid salts, salts of higher alcohol sulfuric esters, salts of liquid fatty oil sulfuric esters and alkylarylsulfonic acid salts. Specifically, as the nonionic surfactants, may be used polyoxyethylene alkyl esters, polyoxyethylene sorbitan alkyl esters, acetylene alcohol and acetylene glycol. The content (% by mass) of the surfactant is preferably from 0.01% by mass or more to 5.0% by mass or less based on the total mass of the ink though the content varies according to the kind of the dispersant in the ink.

<Ink Jet Recording Apparatus and Ink Jet Recording Method>

Figure 4:
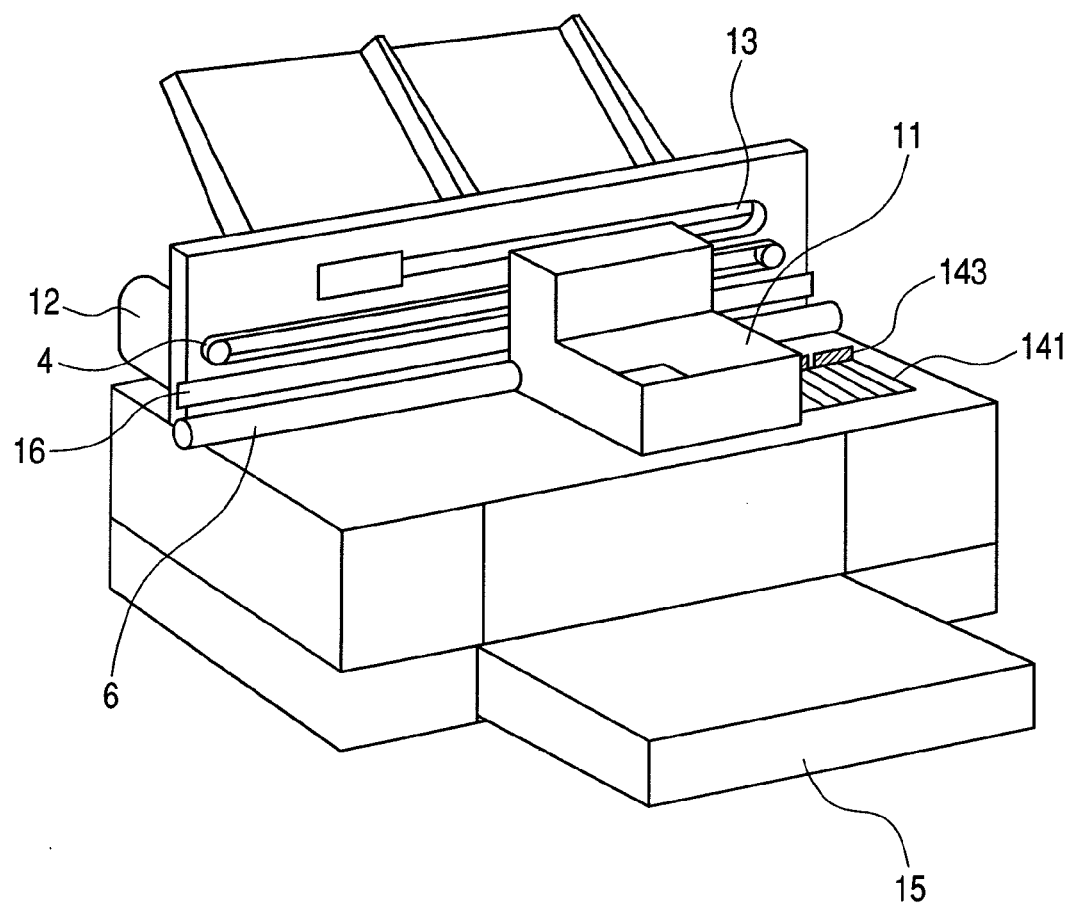
FIG. 4 is an appearance perspective view of an ink jet recording apparatus.

Hereinafter, an ink jet recording apparatus for ejecting the ink and further the coating liquid according to the present invention by the ink jet method will be described below. FIG. 4 is an appearance perspective view of an ink jet recording apparatus for conducting recording using a recording head (hereinafter referred to as a recording head) of an ink jet system. The inks used in the present invention are ejected by the ink jet system. The coating liquid according to the present invention may be either ejected by the ink jet system or applied to a recording medium by a roll coater system or any other method than the ink jet system. Incidentally, the ink jet system is a system in which ejection is conducted by the action of thermal energy or a system in which ejection is conducted by the action of mechanical energy. The inks and coating liquid used in the present invention are more preferably applied to the ink jet system in which ejection is conducted by the action of thermal energy.

A carriage 11 detachably mounts a head cartridge having a recording head and a cartridge storing an ink integrally and is reciprocatingly moved (this moving direction is referred to as a main scanning direction) by a carriage motor 12. The driving force of the carriage motor 12 is transmitted to the carriage 11 by a belt 4. The movement of the carriage 11 in the main scanning direction is supported by a guide shaft 6. A flexible cable 13 transmits an electric signal from a control part to the recording head. A cap 141 and a wiper blade 143 are used for conducting a recovery operation for the recording head. A cassette 15 stores recording media in a stacked state. An encoder sensor 16 optically reads the position of the carriage 11.

Figure 5:
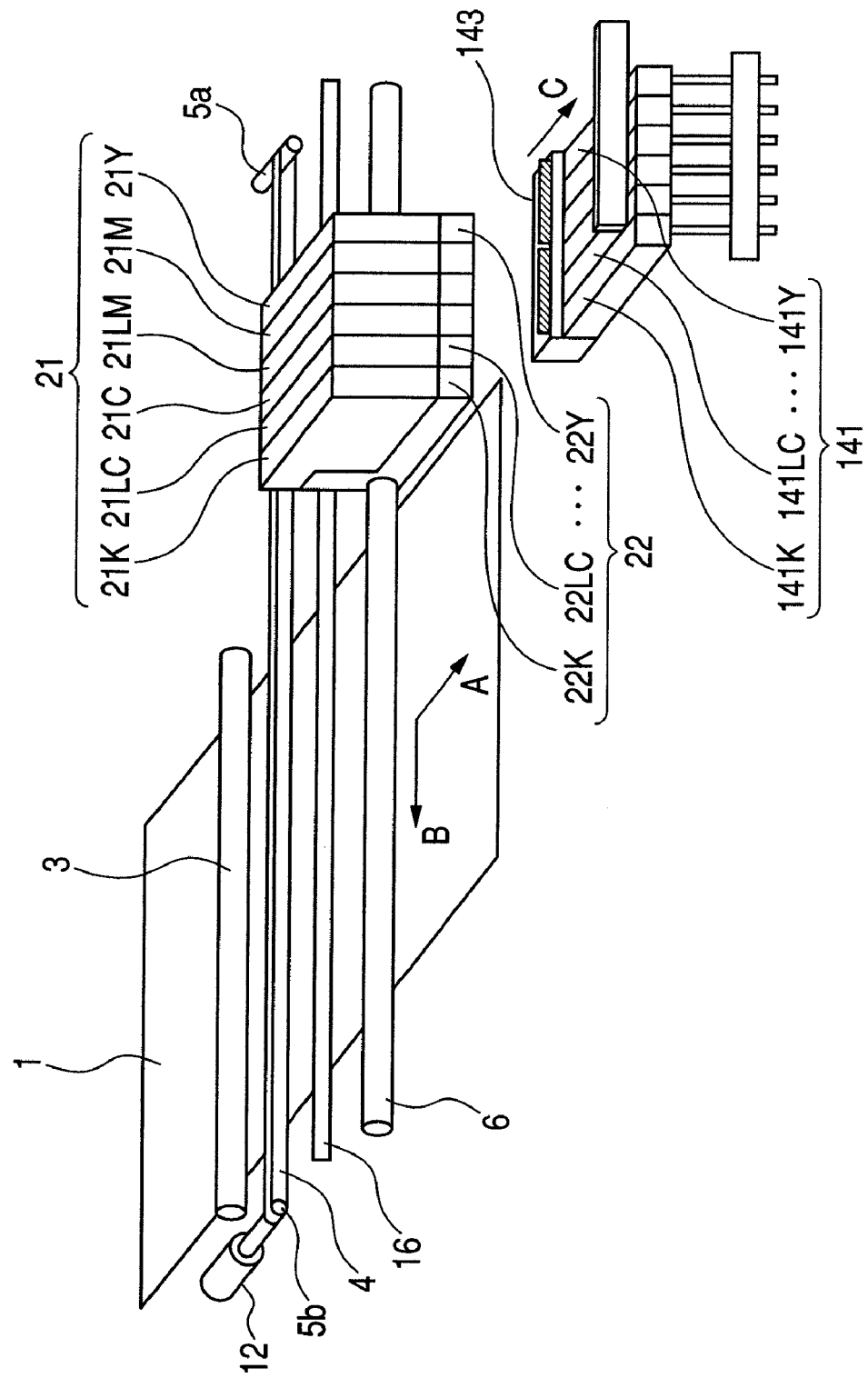
FIG. 5 is a perspective view illustrating the construction in the vicinity of a carriage in the ink jet recording apparatus in FIG. 4.

FIG. 5 is a perspective view illustrating the construction in the vicinity of the carriage in the ink jet recording apparatus in FIG. 4 in more detail. Here, description is given taking an ink jet recording apparatus, in which 6 inks of black (K), light cyan (LC), dark cyan (C), light magenta (LM), dark magenta (M) and yellow (Y) colors are charged, and by which a photograph-like high-quality color image can be recorded, as an example. A recording head 22 is made up of recording heads 22K, 22LC, 22C, 22LM, 22M and 22Y, which eject the 6 inks, respectively.

An ink cartridge 21 is made up of ink cartridges 21K, 21LC, 21C, 21LM, 21M and 21Y, which store the 6 inks to be fed to the respective recording heads, respectively. A cap 141 serves to cap the respective ejection orifices of the recording heads and is made up of 6 caps 141K, 141LC, 141C, 141LM, 141M and 141Y. Incidentally, when these recording heads and ink cartridges are separately indicated, the symbols attached thereto are used to indicate them, while when these are inclusively indicated, the recording head, the ink cartridge and the cap are generically indicated by "22", "21" and "141", respectively.

Here, an embodiment that the head cartridge is made up of the recording head 22 and the ink cartridge 21 has been described. In the present invention, the head cartridge may have such a structure that the recording head and the ink cartridge are integrally formed with each other, or a structure that these parts are separably formed.

As illustrated in FIG. 4 and FIG. 5, the carriage motor 12 is connected to the carriage 11 through the belt 4 and pulleys 5a and 5b. The carriage 11 is reciprocatingly scanned along the guide shaft 6 by the drive of the carriage motor 12.

Figure 6:
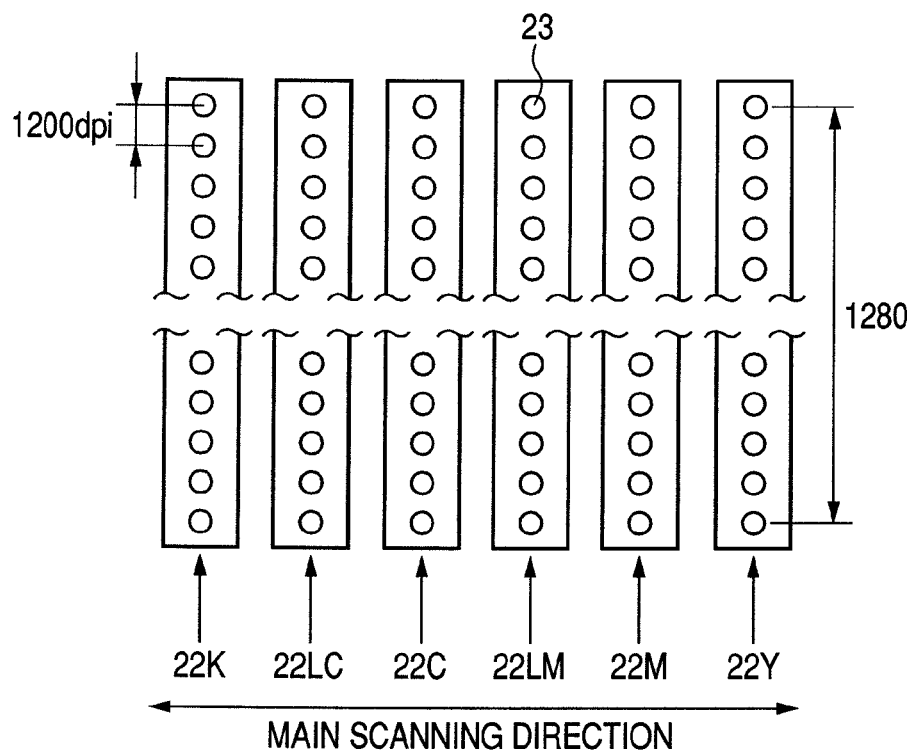
FIG. 6 typically illustrates a recording head 22 viewed from an ejection orifice side.

FIG. 6 typically illustrates the recording head 22 viewed from an ejection orifice side. In each of the recording heads 22K, 22LC, 22C, 22LM, 22M and 22Y, 1,280 ejection orifices are arranged with a resolution of 1,200 dpi to form an array of ejection orifices. These 6 recording heads are arranged in the main scanning direction. The amount of an ink ejected from one ejection orifice 23 is about 4 ng. The opening area of the ejection orifice 23 has been controlled for making an ejection quantity as small as possible to conduct high-quality recording.

The recording operation in the ink jet recording apparatus of the above-described construction will hereinafter be described in detail with reference to FIG. 4 to FIG. 6. Plural recording media 1 stacked in the cassette 15 are fed one by one by a feed roller (not illustrated). In a recording-operating region, the recording medium 1 is conveyed to a conveying roller 3 between the recording head 22 and a platen by the operation of other auxiliary conveying rollers (not illustrated) such as spurs or rollers.

The ink is fed from the ink cartridge 21. The recording head 22 conducts recording on the recording medium 1 in a width corresponding to the number of ejection orifices of the recording head 22 according to an image signal while being moved in a direction (forward direction in main scanning) shown by an arrow B in FIG. 5. Specifically, the recording head is driven based on the image signal according to the timing of reading by the encoder 16 to eject and apply the ink to the recording medium 1, thereby forming an image.

When recording of one scan has been completed in the direction (forward direction in main scanning) shown by the arrow B, the recording head conducts recording in order of Y, M, LM, C, LC and K while being moved in the direction (return direction in main scanning) shown by the arrow B. In such a manner, reciprocating recording is conducted. After one recording operation (one scan) toward one direction has been completed, the conveying roller 3 is driven before the next recording operation is started, thereby is intermittently conveying the recording medium 1 by a predetermined quantity in a direction (secondary scanning direction) shown by an arrow A. The recording operation of one scan and the conveyance of the recording medium by the predetermined quantity are repeated as described above, thereby conducting recording on the recording medium 1.

At the time the recording head 22 has been returned to its home position, clogging of the ejection orifices 23 can be solved by a recovery mechanism as needed. The cap 141 serves to cap the ejection orifices 23 of the recording head 22 for ink-sucking operation upon the recovery of the ejection orifices 23 or the prevention of drying upon suspending. The wiper blade 143 wipes a face of the recording head 22, at which the ejection orifices 23 are present while being moved in a direction shown by an arrow C, thereby removing the ink.

Figure 7:
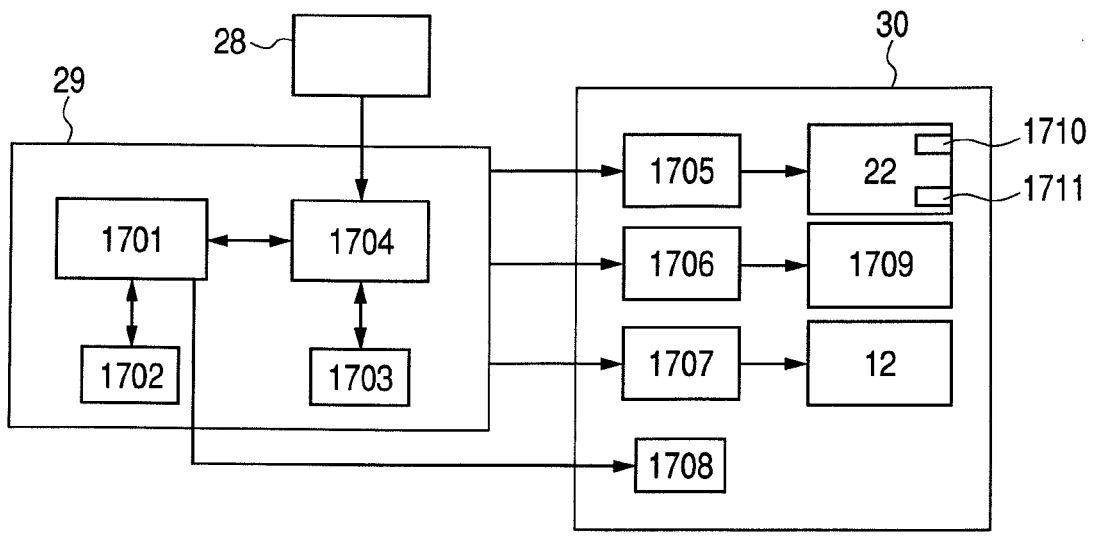
FIG. 7 is a block diagram illustrating a control system of the ink jet recording apparatus.

Control constitution for executing record control of the ink jet recording apparatus will now be described. FIG. 7 is a block diagram illustrating a control system of the ink jet recording apparatus. Here the construction where the coating liquid according to the present invention is ejected by the ink jet method will be described.

Multinary image data from an image input device such as a scanner or digital camera and multinary image data stored in various recording media such as a hard disk are inputted in an image input part (interface) 28. An image processing part 29 converts the multinary image data inputted in the image input part 28 to binary image data by conducting image processing, which will be described subsequently. The binary image data includes binary image data (ink ejection data) for ejecting a plurality of inks (respective inks of cyan (C), magenta (M), yellow (Y) and black (K)) and binary ejection data for ejecting the coating liquid. CPU 1701 controls respective parts of the recording apparatus. ROM 1702 stores a control program and an error processing program, which are executed by the CPU 1701. RAM 1703 temporarily stores various data (recording signals, and image data and ejection data fed to the recording head 22). A gate array 1704 conducts feed control of recording data to the recording head 22 and also conducts data transfer control among the image input part 28, the CPU 1701 and the RAM 1703.

The binary image data and binary ejection data converted in the image processing part 29 is inputted in an image output part 30 (FIG. 7) to form an image. The construction illustrated in FIG. 5 corresponds to the image output part 30. The carriage motor 12 moves the recording head 22, and a conveying motor 1709 conveys the recording medium 1. A head driver 1705 drives the recording head 22, and motor drivers 1706 and 1707 drive the conveying motor 1709 and the carriage motor 12, respectively.

The recording signal inputted through the image input part 28 is converted to binary image data and binary ejection data by the gate array 1704 and CPU 1701. The motor drivers 1706 and 1707 are driven, and the recording head 22 is driven based on the binary image data and binary ejection data sent to the head driver 1705, whereby recording is conducted.

The temperature control of the recording head 22 is conducted based on a detected temperature of an environment, in which the ink jet recording apparatus is installed. The recording head 22 is equipped with an ejection heater as an ejection energy-generating unit, and a heat-retaining heater 1710 for controlling the temperature of the inks is provided in the vicinity of the array of ejection orifices. The CPU 1701 conducts an ON/OFF control on the temperature-retaining heater 1710 according to an environmental temperature detected by a thermistor 1708, whereby the recording head 22 is controlled to an optimum temperature. A temperature in the interior of the recording head, which is outputted from a temperature sensor 1711 provided within the recording head 22, is monitored, whereby the temperature of the recording head 22 may also be controlled.

<Ink Jet Recording Method>

Hereinafter, an ink jet recording method, one of the embodiments of the present invention, using the above-mentioned ink jet recording apparatus. The ink jet recording method according to the present invention has an image forming step of forming an image on a recording medium with an ink by an ink jet method and a coating layer forming step of applying a coating liquid to a region including at least the image to form a coating layer having a film thickness of from 0.10 μm or more to 1.0 μm or less in at least a part thereof, and above-mentioned coating liquid of the present invention is used as the coating liquid. Upon the application of the coating liquid, it is preferable to apply the coating liquid to the region including the image formed on the recording medium with the ink by an ink jet system. In order to sufficiently achieve the effect of scratch resistance brought by using the coating liquid according to the present invention, it is particularly preferable to surely apply the coating liquid on to a pigment layer making up the image formed with the ink.

No particular limitation is imposed on a method for applying the coating liquid of present invention in the ink jet recording method so far as the coating liquid can be applied on to the pigment layer and the specific film thickness can be obtained. For example, a publicly known method such as a roll coater system, bar coater system, blade coater system or gravure coater system may be used. A non-contact system such as a spray system or ink jet system may also be used. In order to apply the coating liquid on the pigment layer making up the image sufficiently, it is preferable to use a roll coater system and ink jet system, more preferably to use ink jet system.

In the ink jet recording method of the present invention, it is necessary to form a coating layer having a film thickness of from 0.10 μm or more to 1.0 μm or less in at least a part thereof. The amount of the coating liquid applied by the ink jet system can be controlled by suitably determining the recording duty according to resolution. The amount of the coating liquid applied by the roll coater system can be controlled by suitably determining the rotational speed of a roller and the contact pressure of the roller to the recording medium.

In the ink jet recording method of the present invention, as it is necessary to apply the coating liquid the region containing the image, it is preferable to conduct the step of applying the coating liquid after the image forming stepwith ink by the ink jet system. It is particularly preferable to apply the coating liquid just after the image is formed with ink by the ink jet system, for example, within about 10 seconds after the formation of the image. The reason for it is that a time interval from the formation of the image to the application of the coating liquid becomes short, so that the formation of the coating layer by applying the coating liquid can be exactly controlled to effectively improve the scratch resistance of the image.

The scratch resistance of the image can be greatly improved by applying the coating liquid of the present invention on to the pigment layer. However, when the coating liquid is applied to only the region of the image (for example, on the pigment layer), a difference in slip properties between the region in which the image has been formed and the region in which no image has been formed becomes great. For this reason, the coating liquid may preferably be applied to the region, in which no image has been formed, for the purpose of achieving uniform slip properties over the whole region of the recording medium. After the coating liquid is applied to the recording medium, a drying step by hot air or infrared radiation may also be conducted for accelerating the formation of a film of the coating layer formed.

(Embodiment of Record Control)

In the present invention, it is particularly preferable to conduct the step of applying the coating liquid to the region containing the image on the recording medium by the ink jet system after the step of forming the image with ink by the ink jet system. The reason for it is that the coating liquid can be exactly and easily applied to the region of the image, and the amount of the coating liquid applied can be optionally controlled, and consequently it can be efficiently achieved for the coating layer to have a film thickness of from 0.10 μm or more to 1.0 μm or less in at least a part thereof. The ink and the coating liquid are applied to the recording medium by the ink jet system in this order, whereby the time difference upon the application of the ink and the coating liquid to the recording medium can be shortened because the coating liquid is applied just after the image is formed, whereby a far excellent coating layer can be formed. Image irregularities caused by, for example, variation of the film thickness of the coating layer or variation of glossiness can also be effectively reduced.

Figure 8:
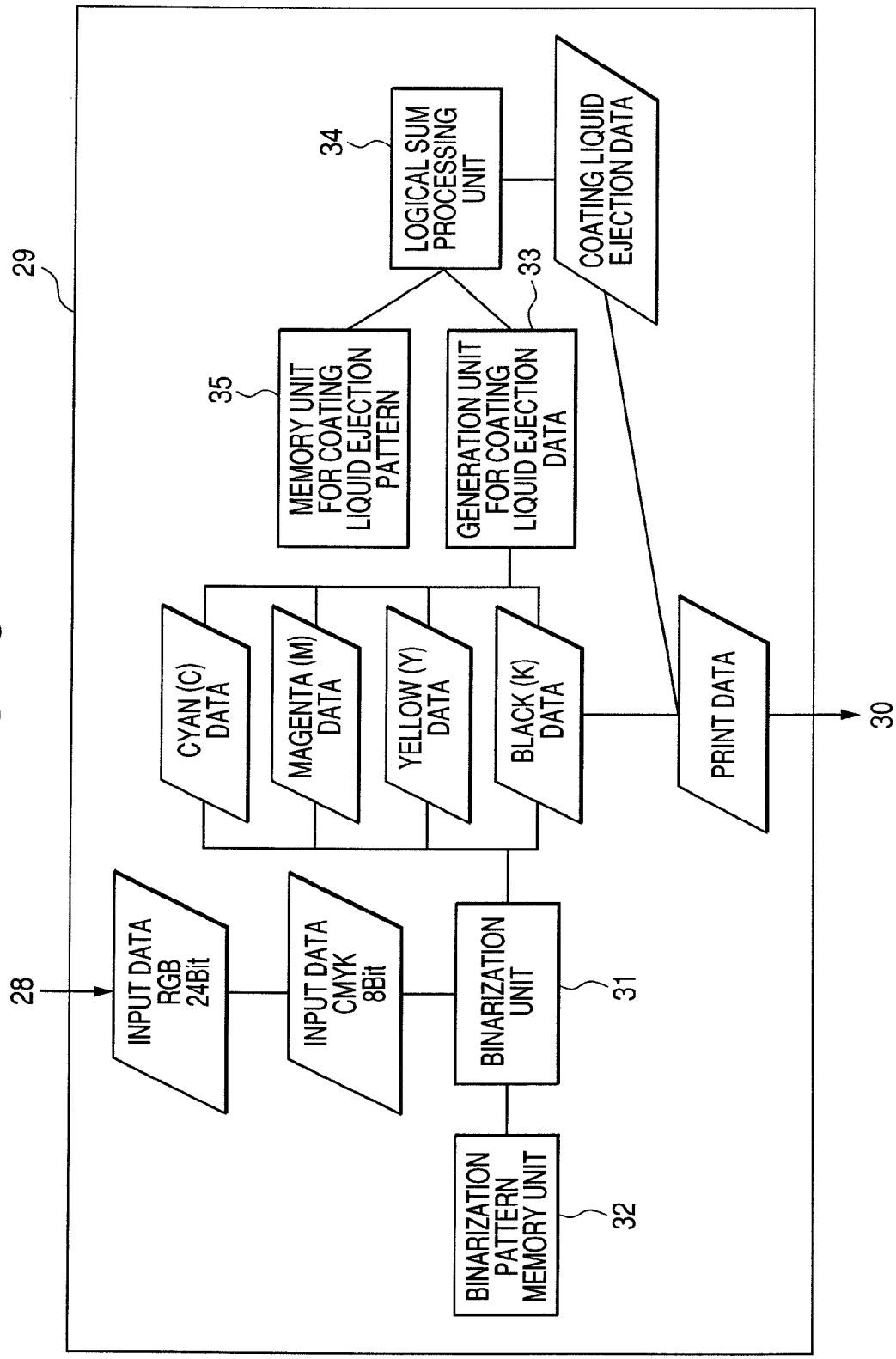
FIG. 8 is a block diagram illustrating an image processing part in FIG. 7.

Hereinafter, another ink jet recording method and ink jet recording apparatus using the coating solution of the present invention will be described. In this method or apparatus conduct formation of an image with an ink and formation of a coating layer with the coating liquid according to the present invention by scanning a recording head plural times on a unit region of a recording medium using the recording head which ejects the ink and the coating liquid based on each an ink ejection data and a coating liquid ejection data by an ink jet system. A method for applying the coating liquid by the ink jet system will hereinafter be described. An embodiment of an image processing system for executing record control of the ink jet recording apparatus is first described. FIG. 8 is a block diagram of the image forming part 29 in FIG. 7. As illustrated in FIG. 8, differences with the ink jet recording apparatus which ejects only the ink on the unit region by scanning the recording head plural times are described below. The apparatus comprises an ejection data generation unit for generating a coating liquid ejection data for ejecting the coating liquid on the unit region after completion of the formation of the image with the ink. The apparatus also comprises a control unit for controlling ejecting the coating liquid from the recording head based on the coating liquid ejection data generated by the ejection data generation unit. The ejection data generation unit generates the coating liquid ejection data so as to eject the coating liquid upon at least one scan including a final scan to the unit region among the scans of the plural times.

In this embodiment, the image data (input data) inputted from the image input part 28 is multinary data of 24 bit as to each color of R, G and B and converted to multinary data of 8 bit as to each ink of C, M, Y and K. The multinary data of 8 bit is developed to binary bit maps (respective data of C, M, Y and K) as to each ink by a binarization unit 31 based on a pattern stored in a binarization pattern memory unit 32.

An ejection data generation unit 33 for coating liquid ejection data can generate binary coating liquid ejection data by subjecting the respective binarized data of C, M, Y and K to image processing, which will be described subsequently. A predetermined coating liquid ejection pattern is stored in a memory unit 35 for coating liquid ejection pattern, and a logical sum (OR) of this ejection pattern and the coating liquid ejection data from the ejection data generation unit 33 for coating liquid ejection data is found by a logical sum processing unit 34. The binary bit map (coating liquid ejection data) found in such a manner is sent together with the binary bit maps (image data of respective inks of C, M, Y and K) of the respective inks as print data to the image output part 30.

(Embodiment of Recording Operation)

An embodiment of a recording operation will be described. In this embodiment, a multipass recording system in which an image and a coating layer are formed on a unit region by a scans is adopted. In this recording system, the respective inks of C, M, Y and K are ejected by 4 scans, thereby forming the image on the unit region, and the coating liquid is ejected by the 4 scans and the subsequent fifth scan to form the coating layer. Incidentally, the unit region means one pixel or one band, and the unit region can be preset as various regions as needed. Incidentally, one pixel means a pixel corresponding to resolution, and one band means a region of an image formed by one carriage scan.

Hereinafter, inks used in the formation of an image are limited to the C (cyan) ink and the M (magenta) ink alone to simplify the explanation. However, the present invention is not limited to these inks alone. The construction of the recording head, the number of ejection orifices and the number of recording passes are also not limited to the following specific examples.

Figure 9:
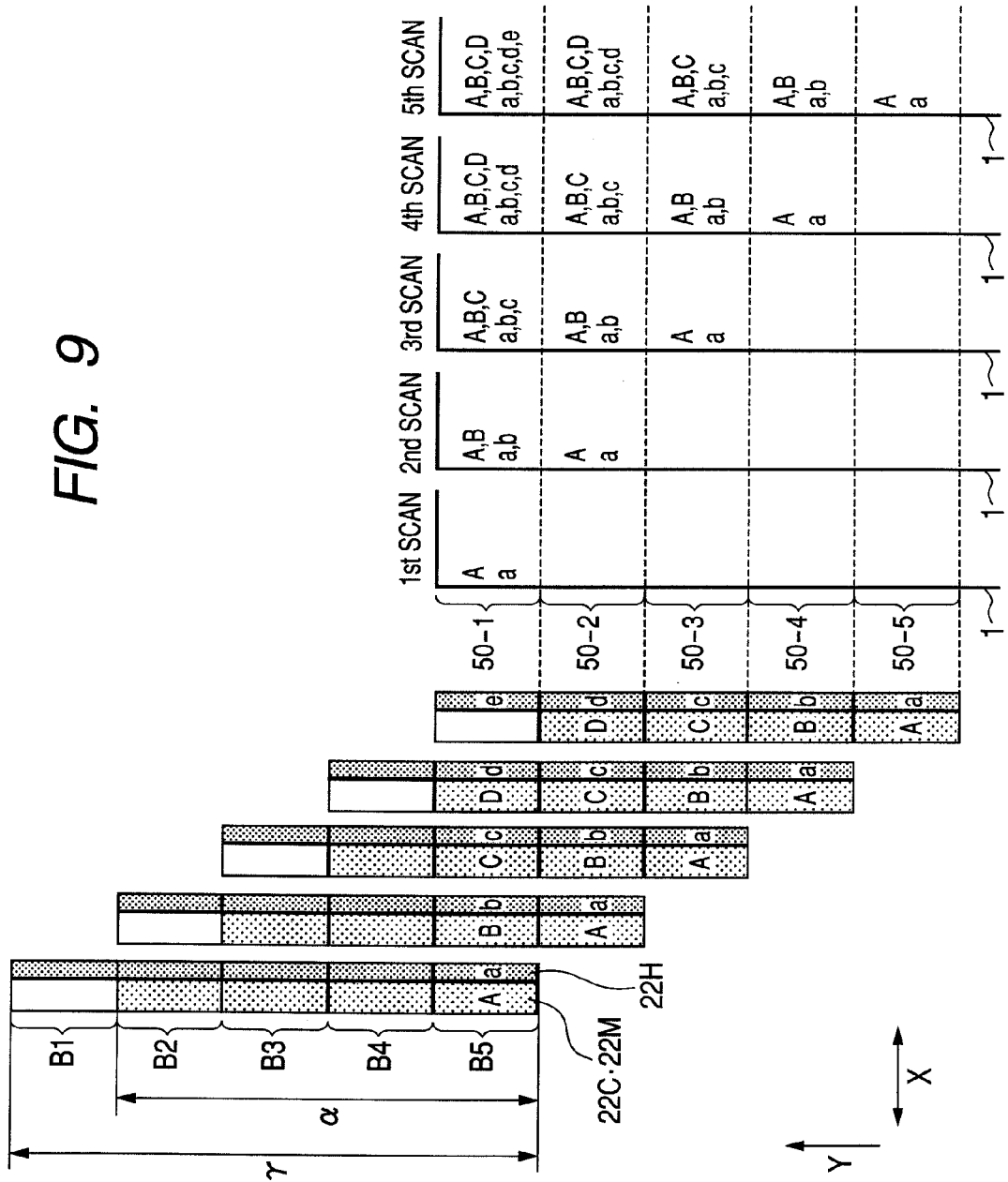
FIG. 9 illustrates a recording method according to an embodiment of an ink jet recording method of the present invention.

FIG. 9 typically illustrates a recording method by an ink jet system in this embodiment. In each of recording heads 22C and 22M for ejecting the C and M inks, respectively, and a recording head 22H for ejecting the coating liquid, 1,280 ejection orifices are divided into 5 equal blocks B1, B2, B3, B4 and B5 each having 256 ejection orifices. The recording heads 22C and 22M each use 1,024 ejection orifices in a range α of the blocks B2 to B5. The ink ejection orifices of the blocks B2 to B5 may hereinafter be referred to as ejection orifices of regions A, B, C and D, respectively. The recording head 22H uses 1,280 ejection orifices in the whole range γ of the blocks B1 to B5. The coating liquid ejection orifices of the blocks B1 to B5 may hereinafter be referred to as ejection orifices of regions a, b, c, d and e, respectively. The recording regions 50-1 to 50-5 on a recording medium 1 are regions corresponding to the respective blocks of the recording head.

In the first scan, the inks are first ejected from the ejection orifices of the region A in the recording heads 22C and 22M based on the first scan recording data in the recording region 50-1. The coating liquid is also ejected from the ejection orifices of the region a in the recording head 22H based on the coating liquid ejection data upon the first scan. The recording medium 1 is then conveyed by a length corresponding to a fifth of the recording head in a secondary scanning direction Y. In FIG. 9, the recording head is illustrated as being relatively moved in a direction reverse to the secondary scanning direction Y.

In the second scan, the inks are ejected from the ejection orifices of the region B in the recording heads 22C and 22M based on the recording data upon the second scan in the recording region 50-1. The coating liquid is also ejected from the ejection orifices of the region b in the recording head 22H based on the coating liquid ejection data upon the second scan. Upon this second scan, the first scan to the recoding region 50-2 is conducted. The recording medium 1 is then conveyed by a length corresponding to a fifth of the recording head in the secondary scanning direction Y.

In the third scan, the inks are ejected from the ejection orifices of the region C in the recording heads 22C and 22M based on the recording data upon the third scan in the recording region 50-1. The coating liquid is also ejected from the ejection orifices of the region c in the recording head 22H based on the coating liquid ejection data upon the third scan. Upon this third scan, the second scan to the recoding region 50-2 and the first scan to the recording region 50-3 are conducted. The recording medium 1 is then conveyed by a length corresponding to a fifth of the recording head in the secondary scanning direction Y.

In the fourth scan, the inks are ejected from the ejection orifices of the region D in the recording heads 22C and 22M based on the recording data upon the fourth scan in the recording region 50-1. The coating liquid is also ejected from the ejection orifices of the region d in the recording head 22H based on the coating liquid ejection data upon the fourth scan. Upon this fourth scan, the third scan to the recoding region 50-2, the second scan to the recording region 50-3 and the first scan to the recording region 50-4 are conducted. In such a manner, the formation of an image in the recording region 50-1 with the respective inks C and M is completed by from the first scan to the fourth scan.

The recording medium 1 is then conveyed by a length corresponding to one fifth of the recording head in the secondary scanning direction Y. In the subsequent fifth scan, the coating liquid is ejected from the ejection orifices of the region e in the recording head 22H based on the coating liquid ejection data upon the fifth scan. The application of the coating liquid to the recording region 50-1, i.e., the formation of a coating layer 3-1 is completed. Upon this fifth scan, the fourth scan to the recoding region 50-2, the third scan to the recording region 50-3, the second scan to the recording region 50-4 and the first scan to the recording region 50-5 are conducted. The same scanning is hereinafter repeated, thereby successively conducting the formation of an image and the formation of a coating layer 3-1 on the recording regions 50-2, 50-3, . . . .

(Generation Method of Coating Liquid Ejection Data)

An embodiment of the generation method of coating liquid ejection data will be described along the flow of image processing in the image processing system in FIG. 8. In this embodiment, the ejection data generation unit thins down the coating liquid ejection data corresponding to the plural unit regions in a predetermined proportion using a mask pattern for the coating liquid as described below.

In this embodiment, such a pattern (coating liquid mask pattern) that the coating liquid ejection data is thinned down in a predetermined proportion (about 75% in this embodiment) in a unit matrix of 4×4 pixels as illustrated in FIG. 10 is stored in advance in the memory unit 35 (see FIG. 8). This mask pattern is a pattern for coating liquid ejection data for ejecting the coating liquid so as to form a coating layer on the image formed on the recording medium with the inks for improving the scratch resistance of the image. This pattern for coating liquid ejection data corresponds to a pattern of dots formed with the coating liquid ejected. Incidentally, the predetermined proportion (thinned-down proportion) may be optionally preset according to the compositions of the coating liquid and inks and the kind of the recording medium for forming a coating layer having a desired film thickness.

The pattern illustrated in FIG. 10 is a pattern for ejecting the coating liquid so as to form a coating layer 3-1 covering the pigment layer 1-2 in a proportion of about 75%. In this embodiment, when an image is formed on glossy paper (recording medium) with the inks, even the coating layer 3-1 covering the pigment layer 1-2 in a proportion of about 75% as described above enables inhibition of the peeling-off and the scratch of the image caused by contact with a nail to achieve excellent scratch resistance. In this embodiment, the pattern in FIG. 10 for thinning down the coating liquid ejection data in a proportion of 75% is stored based on such finding. Needless to say, the mask pattern may be such a pattern that the coating layer 3-1 covers the pigment layer 1-2 in a proportion of 100%.

As described above, the bit maps (C and M data) of the respective inks C and M are binarized by the binarization unit 31 in FIG. 8. When these C and M data are such data that ink dots of C and M are formed in the recording region 50-1 (see FIG. 9) as illustrated in, for example, FIG. 11, coating liquid ejection data are generated by the following image processing. In FIG. 11, the C data for forming dots of the cyan ink is indicated as "C", and the M data for forming dots of the magenta ink is indicated as "M". The same shall apply to other drawings.

To conduct the image processing in this embodiment, the apparatus needs to comprise a detecting unit for detecting a scan upon completion of the image formation with the ink among the scans of the plural times for every unit region based on the ink ejection data for ejecting the ink from the recording head. And the ejection data generation unit generates the coating liquid ejection data based on the detected result generated by the detecting unit so as to eject the coating liquid upon at least one scan including a final scan to the unit region among the scans of the plural times inclusive the scan upon the completion of the image formation. First, based on the binary bit maps (C and M data) of the respective inks C and M, the ejection data generation unit 33 for coating liquid ejection data (see FIG. 8) detects what scan finished the formation of an image with these inks for each one pixel. Therefore, these C data and M data are resolved into data for every scan of from the first scan to the fourth scan. The C and M data in the first scan to the fourth scan in the recording region 50-1 in FIG. 9 correspond to the regions A, B, C and D in the recording heads 22C and 22M. In this embodiment, the C data is resolved as illustrated in FIGS. 12A to 12D, and the M data is resolved as illustrated in FIGS. 13A to 13D. The sum of the C data and the M data is then found for every scan as illustrated in FIGS. 14A to 14D.

In FIG. 15, the data (FIG. 14A) in the first scan, the data (FIG. 14B) in the second scan, the data (FIG. 14C) in the third scan and the data (FIG. 14D) in the fourth scan are indicated in terms of the numerals of "1", "2", "3" and "4", respectively. At this time, when data of different scans overlap in one pixel, a greater numeral is adopted for detecting a scan at which the formation of the image with the inks is completed. In such a manner, the scan sat which the formation of the image is completed (scan upon completion of image formation) is detected for every unit region (every pixel or every bit). In other words, the scan number (from 1 to 4) upon completion of the image formation is detected based on the data in FIGS. 14A to 14D. The coating liquid comes to be ejected upon at least one scan including a final scan to the unit region on and after the plural scans upon completion of the image formation.

As illustrated in FIG. 16, "1" is then added to the data (numerals) in FIG. 15. In blank pixels where data (numeral) is not present originally in FIG. 15, it is regarded as the formation of the image having been already completed, and such a pixel is indicated as "1" in such a manner that the coating layer can be ejected in the first scan as described below. The above is detail of the process in the ejection data generation unit 33 for coating liquid ejection data.

The logical sum of the pattern of FIG. 10 stored in advance in the memory unit 35 and the data of FIG. 16 generated by the ejection data generation unit 33 is then taken by the logical sum processing unit 34 to generate data in FIG. 17. This data is divided into from the first scan to the fifth scan of the recording head 22H for coating liquid ejection. In other words, the data obtained by the logical sum is divided into the first, second, third, fourth and fifth scans according to numerals "1", "2", "3", "4" and "5" as illustrated in FIGS. 18A to 18E. In FIGS. 18A to 18E, the coating liquid data (dot data) is indicated as "H". In the first, second, third, fourth and fifth scans, the ejection orifices in the whole range γ (regions a, b, c, d and e) of the recording head 22H are used as described above.

The coating liquid ejection data for every scan is generated in such a manner, whereby the coating liquid can be ejected by using the whole range γ of the recording head 22H for ejecting the coating liquid as described above. Incidentally, the method for generating the coating liquid ejection data from the ejection data of the respective inks and the method for dividing the coating liquid ejection data into the respective scans are not limited to the above-described methods alone.

The ejection data of the respective inks and the coating liquid ejection data are sent as print data to the image output part 30. As described above, the image output part 30 forms the image and the coating layer based on this print data.

As described above, in this embodiment, the final scan is detected for every pixel in plural scans for forming the image. In other words, the scan at which the formation of the image is completed (scan upon completion of image formation) is detected for every pixel, and the coating liquid is ejected upon a scan subsequent to the scan detected. Therefore, one finally ejected among the inks and coating liquid ejected for every pixel is the coating liquid, so that the coating liquid is ejected so as to cover the image formed with the respective inks to form the coating layer, whereby the scratch resistance of the image can be improved.

In this embodiment, the scanning for ejecting the coating liquid has been divided into the final scan (fifth scan) and plural scans (first, second, third and fourth scans) prior to the final scan. However, in this embodiment, it is only necessary that after the formation of the image to the unit region such as one pixel unit is completed, the coating liquid can be ejected to the unit region in plural scans. Accordingly, the number of divisions of the ejection time of the coating liquid and the dividing method are not specified to the above-described embodiments alone. For example, the ejection time may also be divided into the final scan (fifth scan) and the first and third scans prior to the final scan. In this embodiment, the coating liquid is ejected upon the first scan in pixels where ink ejection data is not present (blank pixels). However, the same effect can be achieved even when the coating liquid is ejected by only one scan upon the final scan. Accordingly, the number of divisions of the ejection scans of the coating liquid and the dividing method are not particularly limited as to the pixels where ink ejection data is not present (blank pixels).

Another embodiment as to the method for generating the coating liquid ejection data is described. In this embodiment, the ink ejection data is divided into plural scans of the recording head by a mask pattern, and the above mentioned ejection data generation unit generates the coating liquid ejection data using this mask pattern. Specifically, a mask pattern for dividing the ejection data of the respective inks into scans of plural times is used to set a mask pattern for dividing the coating liquid into scans of plural times and provide the mask pattern in advance. In this embodiment, the coating liquid is ejected by 2 scans of the final scan and last scan, thereby forming the coating layer. Whether the coating liquid is ejected or not is determined according to the mask pattern for coating liquid ejection in either a pixel where the ejection data of the respective inks is present or a pixel where the ejection data of the respective inks is not present as described below.

In this embodiment, the recording system in which the image is formed by 4 scans is also adopted like the above-described embodiment, and inks used in the formation of an image are also limited to the C (cyan) ink and the M (magenta)

ink alone to make description. Incidentally, with respect to the same portions as the above-described embodiment, their descriptions are omitted.

Figure 19:
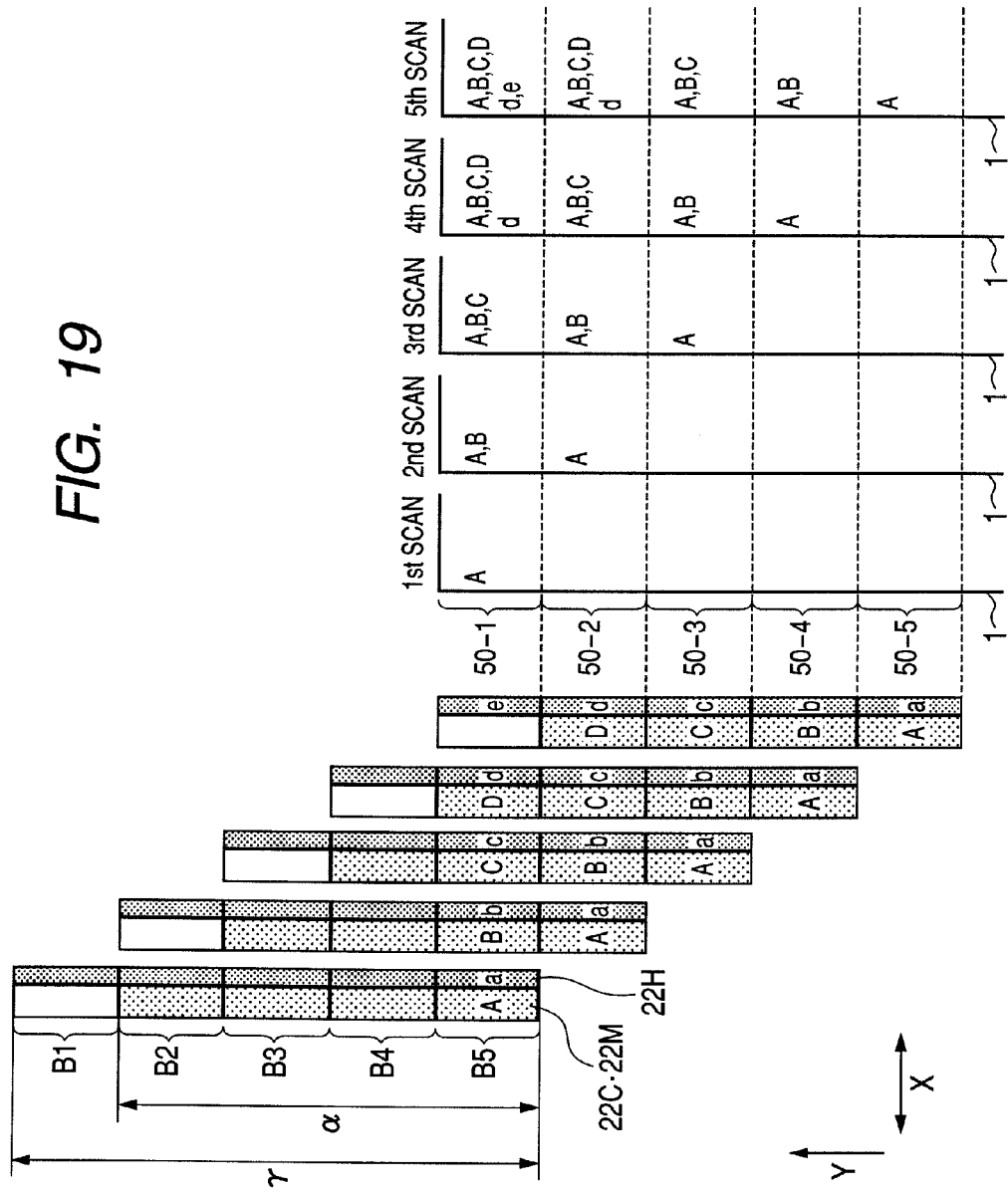
FIG. 19 illustrates a recording method according to another embodiment of an ink jet recording method of the present invention.

FIG. 19 illustrates a recording method in this embodiment. The formation of an image in the recording region 50-1 with the C and M inks is completed by from the first scan to the fourth scan like the above-described embodiment. On the other hand, the coating layer is formed by ejecting the coating layer by 2 scans of the fifth scan that is a final scan and a fourth scan. The coating liquid ejection data for ejecting the coating liquid in such a manner is generated in the following manner.

As described above, the bit maps (C and M data) of the respective inks C and M are binarized by the binarization unit 31 in FIG. 8. When these C and M data are such data that ink dots of C and M are formed in the recording region 50-1 (see FIG. 19) as illustrated in, for example, FIG. 11, coating liquid ejection data are generated by the following image processing.

The C data and M data are resolved into data for every scan from the first scan to the fourth scan. The C and M data in the first scan to the fourth scan in the recording region 50-1 correspond to the regions A, B, C and D in the recording heads 22C and 22M. Like the above-described embodiment, the C data is resolved as illustrated in FIGS. 12A to 12D, and the M data is resolved as illustrated in FIGS. 13A to 13D. The resolution of the C data is conducted using random masks C provided in advance and illustrated in FIGS. 20A to 20D, and the resolution of the M data is conducted using random masks M provided in advance and illustrated in FIGS. 21A to 21D. FIG. 22 illustrates a random mask corresponding to the sum of the random mask C of the fourth scan and the random mask M of the fourth scan.

A mask pattern in FIG. 23B is used in the generation of coating liquid ejection data in the fifth scan. This mask pattern is the mask pattern in FIG. 22. A pattern (mask pattern in FIG. 23A) reverse to the mask pattern in FIG. 22 is used in the generation of coating liquid ejection data in the fourth scan. The generation of the coating liquid ejection data corresponding to such mask patterns in FIGS. 23A and 23B is detail of the process in the ejection data generation unit 33 for coating liquid ejection data.

The logical sum of the pattern of FIG. 10 stored in advance in the memory unit 35 and the data generated by the ejection data generation unit 33 is then taken by the logical sum processing unit 34 to generate data in FIGS. 23A and 23B. More specifically, the coating liquid ejection data upon the fourth scan is generated by the logical sum of the pattern of FIG. 10 and the coating liquid ejection data corresponding to the mask pattern in FIG. 23A as illustrated in FIG. 24D, and the coating liquid ejection data upon the fifth scan is generated by the logical sum of the pattern of FIG. 10 and the coating liquid ejection data corresponding to the mask pattern in FIG. 23B as illustrated in FIG. 24E.

As illustrated in FIG. 19, the ejection orifices in the region d of the recording head 22H are used in the ejection of the coating liquid upon the fourth scan, and the ejection orifices in the region e are used upon the fifth scan. In other words, the coating liquid can be ejected in two scans using the ejection orifices in the regions d and e. Incidentally, the method for generating the coating liquid ejection data from the mask patterns for generating the ejection data of the respective inks is not limited to the above-described method alone.

As described above, in this embodiment, the coating liquid is ejected by two scans of the final scan and the preceding scan based on the mask patterns used in the formation of the image with the inks. Accordingly, coating liquid ejection patterns upon these scans, i.e., arrangement patterns of dots formed with the coating liquid can be determined in advance. As a result, control for recording is made easy even from the viewpoints of structure and time.

In this embodiment, the scanning for ejecting the coating liquid has been divided into the final scan (fifth scan) and the preceding scan (fourth scan). However, in this embodiment, it is only necessary that after the formation of the image to the unit region such as one pixel unit is completed, the coating liquid can be ejected to the unit region in plural scans. Accordingly, the number of divisions of the ejection time of the coating liquid and the dividing method are not specified to the above-described embodiments alone. For example, the ejection time may also be divided into the final scan (fifth scan) and the first and third scans prior to the final scan. In this embodiment, the coating liquid is ejected by two scans of the final scan (fifth scan) and the preceding scan (fourth scan) in pixels where ink ejection data is not present (blank pixels). However, the same effect can be achieved even when the coating liquid is ejected by only one scan upon the final scan. Accordingly, the number of divisions of the ejection scanning of the coating liquid and the dividing method are not particularly limited as to the pixels where ink ejection data is not present (blank pixels). For example, the coating liquid can be ejected upon a first scan in scanning of plural times of the recording head.

EXAMPLES

The present invention will hereinafter be described more specifically by the following Examples and Comparative Examples. However, the present invention is not limited by these examples unless going beyond the gist of the present invention. Incidentally, "part" or "parts" and "%" in the following examples mean part or parts by mass and % by mass unless expressly noted.

The physical property values of respective slippery compounds and resins are values measured by means of the following respective devices. A glass transition temperature ($T_g$) was measured by means of EXSTAR-DSC6200S (trade name; manufactured by SII Nanotechnology). A 50% cumulative volume average particle size ($D_{50}$) was measured by means of Nanotrac UPA-150 (trade name; manufactured by NIKKISO). ICP Atomic Emission Spectrometry was conducted by means of ICP Atomic Emission Spectrometry Equipment SPS-5100 (trade name; manufactured by SII Nanotechnology). Measurement of weight average molecular weight by GPC was conducted by means of High-Speed GPC System HLC-8220GPC (trade name; manufactured by TOSOH).

Preparation of Slippery Compound (Preparation of Slippery Compound 1)

A reaction container equipped with a stirrer, a reflux condenser, a thermometer and a nitrogen inlet pipe was charged with 250 parts of propylene glycol monomethyl ether acetate (PMA) as a solvent, air within the reaction container was purged with nitrogen gas to eliminate oxygen, and the internal temperature of the container was then raised to 80° C. Thereafter, a solution of 3 parts of azobisisobutyronitrile as a polymerization initiator dissolved in 20 parts of PMA was added. A solution containing 50 parts of methyl methacrylate (MMA), 20 parts of n-butyl acrylate (n-BA), 10 parts of acrylic acid (AA) and 20 parts of mono terminal methacryloxy-modified polydimethylsiloxane was added dropwise to the reaction container over 2 hours while keeping the internal temperature at 80° C. Incidentally, MONO TERMINAL SILAPLANE FM-0721 (product of Chisso Corporation; weight average molecular weight of polydimethylsiloxane segment: 5,000, n in the structural formula (1): 6) was used as the mono terminal methacryloxy-modified polydimethylsiloxane. Thereafter, the contents were stirred for 3 hours while keeping the internal temperature at 80° C., thereby completing the reaction. After completion of the reaction, PMA was removed by heating and drying under reduced pressure to obtain a slippery compound 1 as solids. This slippery compound 1 was neutralized with an aqueous solution of potassium hydroxide to obtain an aqueous solution having a solid content concentration of 20% by mass.

The copolymerization ratio (mass ratio) of the slippery compound 1 obtained above was MMA:n-BA: AA:mono terminal methacryloxy-modified polydimethylsiloxane=50:20:10:20, and the amount of the polydimethylsiloxane segment copolymerized was 20%. The weight average molecular weight of the slippery compound 1 in terms of polystyrene was 20,000. The glass transition temperature of the slippery compound 1 was 80° C. The 50% cumulative volume average particle size ($D_{50}$) of the slippery compound 1 was 30 nm.

(Preparation of Slippery Compound 2)

A slippery compound 2 was obtained as solids in the same manner as in the slippery compound 1 except that the copolymerization components were changed to 50 parts of ethyl acrylate (EA) and 30 parts of acrylic acid (AA), and the kind and amount of the mono terminal methacryloxy-modified polydimethylsiloxane was changed. Incidentally, 20 parts of MONO TERMINAL SILAPLANE FM-0711 (product of Chisso Corporation; weight average molecular weight of polydimethylsiloxane segment: 1,000, n in the structural formula (1): 12) was used as the mono terminal methacryloxy-modified polydimethylsiloxane. The slippery compound 2 obtained as solids was neutralized with an aqueous solution of potassium hydroxide to obtain an aqueous solution having a solid content concentration of 20% by mass.

The copolymerization ratio (mass ratio) of the slippery compound 2 obtained above was EA:AA:mono terminal methacryloxy-modified polydimethylsiloxane=50:30:20, and the amount of the polydimethylsiloxane segment copolymerized was 20%. The weight average molecular weight of the slippery compound 2 in terms of polystyrene was 12,000. The glass transition temperature of the slippery compound 2 was 35° C. Incidentally, the slippery compound 2 was in a state dissolved in the aqueous solution, and so the 50% cumulative volume average particle size ($D_{50}$) of the slippery compound 2 could not be measured.

(Slippery Compound 3)

A commercially available acrylsilicone copolymer (trade name: SYMAC US-450; product of Toagosei Chemical Industry Co., Ltd.) was used as a slippery compound 3. The glass transition temperature of the slippery compound 3 was 70° C. The 50% cumulative volume average particle size ($D_{50}$) of the slippery compound 3 was 150 nm. The amount of the polydimethylsiloxane segment converted from the content of silicon in the slippery compound 3 measured by ICP Atomic Emission Spectrometry was 19% by mass. The weight average molecular weight of the slippery compound 3 in terms of polystyrene was 19,000.

(Slippery Compound 4)

A commercially available acrylsilicone copolymer (trade name: SYMAC US-480; product of Toagosei Chemical Industry Co., Ltd.) was used as a slippery compound 4. The glass transition temperature of the slippery compound 4 was 50° C. The 50% cumulative volume average particle size ($D_{50}$) of the slippery compound 4 was 100 nm. The amount of the polydimethylsiloxane segment converted from the content of silicon in the slippery compound 4 measured by ICP Atomic Emission Spectrometry was 23% by mass. The weight average molecular weight of the slippery compound 3 in terms of polystyrene was 9,000.

(Slippery Compound 5)

A commercially available acrylsilicone copolymer (trade name: Polon MF-40; product of Shin-Etsu Chemical Co., Ltd.) was used as a slippery compound 5. The glass transition temperature of the slippery compound 5 was 55° C. The 50% cumulative volume average particle size ($D_{50}$) of the slippery compound 5 was 350 nm. The amount of the polydimethylsiloxane segment converted from the content of silicon in the slippery compound 5 measured by ICP Atomic Emission Spectrometry was 35% by mass.

(Slippery Compound 6)

A commercially available polyalkylene oxide-modified silicone oil (trade name: BYK-333; product of BYK-Chemie Japan KK) was used as a slippery compound 6. The weight average molecular weight of the slippery compound 6 was 5,000.

(Slippery Compound 7)

A commercially available polyalkylene oxide-modified silicone oil (trade name: BYK-348; product of BYK-Chemie Japan KK) was used as a slippery compound 7. The weight average molecular weight of the slippery compound 7 was 600.

Preparation of Resin (Preparation of Resin 1)

A reaction container equipped with a stirrer, a reflux condenser, a thermometer and a nitrogen inlet pipe was charged with propylene glycol monomethyl ether acetate (PMA) as a solvent and azobisisobutyronitrile as a polymerization initiator. A solution containing methyl methacrylate (MMA), n-butyl acrylate (nBA) and methacrylic acid (MAA) was added dropwise to the reaction container under a nitrogen gas atmosphere to conduct a radical polymerization reaction with heating, thereby obtaining an MMA-nBA-MAA type resin 1. After completion of the reaction, PMA was removed by heating and drying under reduced pressure to obtain a resin 1 as solids. This resin 1 was neutralized with an aqueous solution of potassium hydroxide to obtain an aqueous solution having a solid content concentration of 20% by mass. Incidentally, the resin 1 was in a state dissolved in the aqueous solution, and so the 50% cumulative volume average particle size ($D_{50}$) of the resin 1 could not be measured. The weight average molecular weight of the resin 1 in terms of polystyrene was 12,000. The glass transition temperature of the resin 1 was 80° C. The acid value of the resin 1 as measured by a neutralization titration method was 60 mg KOH/g.

(Preparation of Resin 2)

A synthesis was conducted by the same procedure as in the resin 1 except that the amounts of methyl methacrylate (MMA), n-butyl acrylate (nBA) and methacrylic acid (MAA) used as monomers were changed, thereby obtaining an MMA-nBA-MAA type resin 2. The resin 2 was neutralized with an aqueous solution of potassium hydroxide to obtain an aqueous solution having a solid content concentration of 20% by mass. Incidentally, the resin 2 was in a state dissolved in the aqueous solution, and so the 50% cumulative volume average particle size ($D_{50}$) of the resin 2 could not be measured. The weight average molecular weight of the resin 2 in terms of polystyrene was 10,000. The glass transition temperature of the resin 2 was 90° C. The acid value of the resin 2 as measured by a neutralization titration method was 140 mg KOH/g.

(Preparation of Resin 3)

A synthesis was conducted by the same procedure as in the resin 1 except that n-butyl acrylate (nBA) and acrylic acid (AA) were used as monomers, thereby obtaining an nBA-AA type resin 3. The resin 3 was neutralized with an aqueous solution of potassium hydroxide to obtain an aqueous solution having a solid content concentration of 20% by mass. Incidentally, the resin 3 was in a state dissolved in the aqueous solution, and so the 50% cumulative volume average particle size ($D_{50}$) of the resin 3 could not be measured. The weight average molecular weight of the resin 3 in terms of polystyrene was 9,000. The glass transition temperature of the resin 3 was 20° C. The acid value of the resin 3 as measured by a neutralization titration method was 260 mg KOH/g.

Preparation of Coating Liquid

The components shown in the following Table 1 were mixed and sufficiently stirred to prepare coating liquids 1 to 14. Incidentally, "parts" of the slippery compound and resin are indicated as a solid content. The thus-obtained coating liquids 1 to 14 were all colorless and transparent.

The components shown below were mixed, and stirred thoroughly, followed by pressure filtration using a filter of 2.5 μm in pore size (trade name: HDC II; product of Pall) to prepare pigment ink. The average particle size of the pigment in the pigment ink was 120 nm.

| | |
|---|---|
| Pigment dispersion | 35.0 parts |
| Glycerol | 10.0 parts |
| Triethylene glycol | 5.0 parts |
| Polyethylene glycol | 5.0 parts |
| (average molecular weight: 600) | |
| Acetylenol EH | 0.5 parts |
| (surfactant; product of Kawaken Fine Chemicals Co., Ltd.) | |
| Pure water | 44.5 parts |

TABLE 1

| | | Coating liquid | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Slippery compound | Slippery compound 1 | 5.0 | | | | | | | | | | | | | |
| | Slippery compound 2 | | 5.0 | | | | | | | | | | | | |
| | Slippery compound 3 | | | 5.0 | | | 0.5 | | | | | | | | |
| | Slippery compound 4 | | | | 5.0 | | | | | | | | | | |
| | Slippery compound 5 | | | | | 5.0 | | | | | | | | | |
| | Slippery compound 6 | | | | | | | 2.0 | 2.0 | 1.0 | 3.0 | | 2.0 | 2.0 | |
| | Slippery compound 7 | | | | | | | | | | | | | | 2.0 |
| Resin | Resin 1 | | | | | | | 4.0 | | | | 4.0 | | | 4.0 |
| | Resin 2 | | | | | | | | 4.0 | 1.5 | 2.0 | | | | |
| | Resin 3 | | | | | | | | | | | | | 4.0 | |
| Water-soluble organic solvent | Glycerol | 5.0 | 5.0 | 5.0 | 10.0 | 10.0 | 5.0 | 5.0 | 5.0 | 5.0 | 5.0 | 5.0 | 5.0 | 5.0 | 5.0 |
| | Ethylene glycol | 15.0 | 15.0 | 15.0 | 15.0 | 15.0 | 15.0 | 15.0 | 15.0 | 15.0 | 15.0 | 15.0 | 15.0 | 15.0 | 15.0 |
| | Isopropyl alcohol | | | | 5.0 | 5.0 | | | | | | | | | |
| Surfactant | Acetylenol EH (*1) | 0.5 | 0.5 | 0.5 | 0.5 | 0.5 | 0.5 | 0.5 | 0.5 | 0.5 | 0.5 | 0.5 | 0.5 | 0.5 | 0.5 |
| Water | Pure water | 74.5 | 74.5 | 74.5 | 64.5 | 64.5 | 79.0 | 73.5 | 73.5 | 77.0 | 74.5 | 75.5 | 77.5 | 73.5 | 73.5 |

(*1) Acetylene glycol ethylene oxide adduct (product of Kawaken Fine Chemicals Co., Ltd.).

Preparation of Pigment Ink 10 parts of a carbon black (trade name: Printex 85; product of Degussa AG), 4 parts of a sodium salt of styrene-acrylic acid copolymer (acid value: 200, weight average molecular weight: 5,000; trade name: Joncryl 555: product of Johnson Polymer) and 86 parts of pure water were mixed, followed by mixing for 30 minutes. Thereafter, the mixture was dispersed well by means of a bead mill (trade name: LMZ2; product of Ashizawa Finetech) under conditions of a bead diameter of 0.3 mm and a bead filling rate of 85%. Thereafter, the fluid dispersion obtained was treated by centrifugation to remove coarse particles, followed by pressure filtration using a filter of 2.5 μm in pore size (trade name: HDC II; product of Pall) to prepare pigment dispersion. The pigment concentration of pigment dispersion obtained above was 10.0% by mass and the dispersant (solid matter of the resin) concentration was 4.0% by mass.

Production of Recorded Matter

Example 1

The coating liquid 1 was charged into an ink cartridge of an ink jet recording apparatus (trade name: image PROGRAF iPF5000; manufactured by Canon Inc.). The pigment ink obtained above was charged into the ink cartridge same as above. The respective ink cartridges were set in the ink jet recording apparatus in such a manner that the ink cartridge charged with the coating liquid and the ink cartridge charged with the pigment ink are located at the positions of yellow and black, respectively. A4-sized Professional Photopaper PR-101 (trade name; product of Canon Inc.) was used as a recording medium and set in a media cassette of the ink jet recording apparatus.

Recording conditions were set to be an 8-pass bi-direction recording with a resolution of 1,200 dpi, with which an image is formed by 8-pass reciprocating scans. In order to apply the coating liquid on to an image, a mask pattern with which a 100%-duty image is formed by from the first pass to the seventh pass among 8-pass reciprocating scans was used for the pigment ink, and a mask pattern with which a 100%-duty image is formed by the final pass, i.e., the eighth pass without conducting recording from the first pass to the seventh pass was used for the coating liquid. A 100%-duty input signal was sent to the pigment ink and the coating liquid to conduct recording on the recording medium, thereby obtaining a recorded matter.

Example 2

A recorded matter was obtained in the same manner as in Example 1 except that the coating liquid 3 was used.

Example 3

In Example 3, the pigment ink alone was first applied to the recording medium at a 100% duty using the same ink jet recording apparatus under the same recording conditions (resolution: 1,200 dpi, 8-pass bi-direction recording) as in Example 1. Just after the formation of the image, the coating liquid 4 was applied by the following roll coater to obtain a recorded matter. The amount of the coating liquid applied was 0.05 g/A4-size (0.80 g/m$^2$). Incidentally, the amount of the coating liquid applied was determined by measuring the mass of the recorded matter before and just after the coating liquid was applied and finding the difference in mass between before and after the application of the coating liquid.

Figure 25:
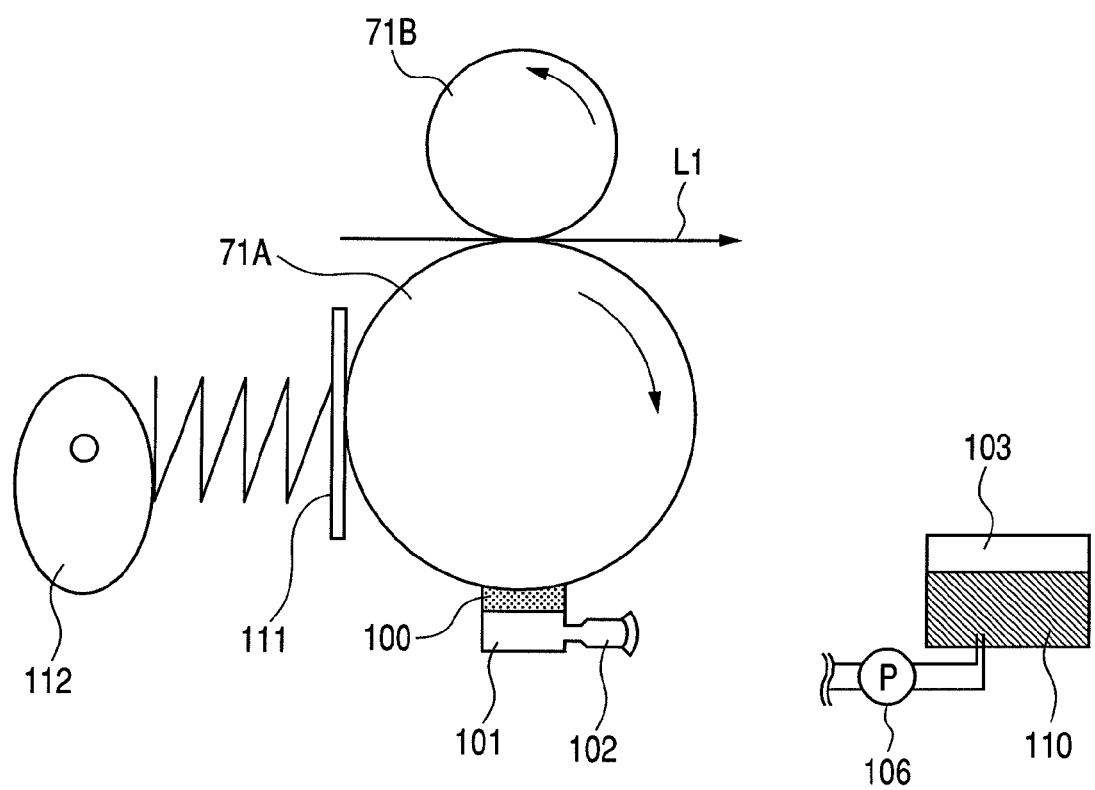
FIG. 25 schematically illustrates a roll coater.

A roll coater having a structure illustrated in FIG. 25 was used for the application of the coating liquid. The driving mechanism of the roll coater is as follows. The coating liquid 110 is stored in a cartridge 103 and fed to a porous body 100 through a feed pump 106, a feed passage 102 and a coating liquid holding chamber 101. In a coating treatment part, a coating roller 71A and a pressing and conveying roller 71B are rotatably held. A regulating blade 111 comes into contact with the coating roller 71A.

A coating roller driving motor (not illustrated) is rotationally driven at a predetermined rate, whereby the coating liquid is drawn up to the coating roller 71A from the porous body 100. The coating amount of the coating liquid drawn up to the coating roller 71A can be set by the pressure control of the regulating blade with a pressing member 112 as well as the rotating speed of the coating roller 71A. the recording medium is conveyed in a direction of an arrow L1, passed through a nip between the coating roller 71A and the pressing and conveying roller 71B to coat the recording medium with the coating liquid, and then discharged from the roll coater.

Example 4

A recorded matter was obtained in the same manner as in Example 3 except that the coating liquid 5 was used. The amount of the coating liquid applied as determined in the same manner as described above was 0.05 g/A4-size (0.80 g/m$^2$).

Example 5

A recorded matter was obtained in the same manner as in Example 1 except that the coating liquid 3 was used, and input signals were controlled to 100% duty for the pigment ink and 40% duty for the coating liquid.

Example 6

A recorded matter was obtained in the same manner as in Example 1 except that the coating liquid 7 was used.

Example 7

A recorded matter was obtained in the same manner as in Example 1 except that the coating liquid 8 was used.

Example 8

A recorded matter was obtained in the same manner as in Example 1 except that the coating liquid 9 was used.

Example 9

A recorded matter was obtained in the same manner as in Example 1 except that the coating liquid 10 was used.

Example 10

A recorded matter was obtained in the same manner as in Example 1 except that the coating liquid 1 was used, and the recording conditions were changed as described below. The recording conditions were set to be an 8-pass bi-direction recording with a resolution is 1,200 dpi, with which an image is formed by 8-pass reciprocating scans. In order to apply the coating liquid on to an image, a mask pattern with which a 100%-duty image is formed by from the first pass to the seventh pass among 8-pass reciprocating scans was used for the pigment ink, and a mask pattern with which a 100%-duty image is formed by final 2 passes, i.e., the seventh pass and eighth pass without conducting recording from the first pass to the sixth pass was used for the coating liquid. The coating liquid was applied to the recording medium by using a mask pattern for coating liquid that is prevented from overlapping a pixel of the seventh pass in the mask pattern for forming the image as described in the embodiment of recording operation.

Comparative Example 1

A recorded matter was obtained in the same manner as in Example 1 except that the coating liquid 1 was used.

Comparative Example 2

A recorded matter was obtained in the same manner as in Example 1 except that the coating liquid 6 was used.

Comparative Example 3

A recorded matter was obtained in the same manner as in Example 1 except that the coating liquid 11 was used.

Comparative Example 4

A recorded matter was obtained in the same manner as in Example 1 except that the coating liquid 12 was used.

Comparative Example 5

A recorded matter was obtained in the same manner as in Example 1 except that the coating liquid 13 was used.

Comparative Example 6

A recorded matter was obtained in the same manner as in Example 1 except that the coating liquid 14 was used.

The numbers of the coating liquids used in the production of the respective recorded matters of Examples 1 to 10 and Comparative Examples 1 to 6, the application methods thereof and main properties of the coating layer are shown collectively in the following Table 2. Incidentally, the thickness of the coating layer was measured as described below.

TABLE 2

|  |  | Number of coating liquid | Application method of coating liquid | Thickness of coating layer [μm] | Coefficient of kinetic friction |
|---|---|---|---|---|---|
| Example | 1 | 1 | Ink jet | 0.3 | 0.10 |
|  | 2 | 3 | Ink jet | 0.3 | 0.07 |
|  | 3 | 4 | Roll coat | 0.4 | 0.08 |
|  | 4 | 5 | Roll coat | 0.5 | 0.12 |
|  | 5 | 3 | Ink jet (*1) | 0.3 | 0.20 |
|  | 6 | 7 | Ink jet | 0.3 | 0.10 |
|  | 7 | 8 | Ink jet | 0.3 | 0.10 |
|  | 8 | 9 | Ink jet | 0.2 | 0.25 |
|  | 9 | 10 | Ink jet | 0.2 | 0.15 |
|  | 10 | 1 | Ink jet | 0.3 | 0.10 |
| Comparative | 1 | 2 | Ink jet | Immeasurable | 0.55 |
| Example | 2 | 6 | Ink jet | Immeasurable | 0.45 |
|  | 3 | 11 | Ink jet | 0.3 | 0.60 |
|  | 4 | 12 | Ink jet | Immeasurable | 0.55 |
|  | 5 | 13 | Ink jet | Immeasurable | 0.60 |
|  | 6 | 14 | Ink jet | 0.3 | 0.60 |

(*1) The coating liquid was applied at 40% duty.

Analysis of Recorded Matter

The surfaces of the recorded matters obtained above were observed through an electron microscope. As a result, the conditions of the surfaces of the respective recorded matters were as follows.

Recorded articles the pigment layer of which was covered with the coating layer: Recorded articles obtained in Examples 1 to 4, 6 to 8 and 10, and Comparative Examples 3 and 6.

Recorded articles a part of the pigment layer of which was exposed: Recorded article obtained in Example 5.

Recorded articles the pigment layer of which was exposed, and for which the presence of the coating layer could not be recognized: Recorded articles obtained in Example 9, and Comparative Examples 1, 2, 4 and 5.

Incidentally, in the respective recorded matters obtained in Comparative Examples 1, 2, 4 and 5, the pigment layer was exposed, and the presence of the coating layer could not be recognized as described above. The reason for it is considered to be attributable to the fact that the component making up the coating layer penetrated in the interior of the pigment layer.

The Young's moduli (E) of the coating layers in the recorded matters obtained above were measured by means of a Nanoindenter XP (trade name; manufactured by MTS). Incidentally, the Young's modulus was measured in the thickness-wise direction of the coating layer, and the value at one fifth position of the coating layer from above in the direction of its film thickness was regarded as the Young's modulus of the coating layer. The Young's moduli of the coating layers in the recorded matters obtained in Examples 1 to 4 were measured. As a result, the Young's modulus in the recorded matters of Examples 1, 2 and 4 were 1.5 GPa or more, but was less than 1.5 GPa in the recorded matter of Example 3.

Evaluation of Recorded Matter (Film Thickness of Coating Layer)
The sections of the recorded matters obtained above were observed through an electron microscope to measure the film thickness of each coating layer. The film thicknesses of the coating layers are shown in Table 3.

(Coefficient of Kinetic Friction)
The coefficient of kinetic friction to a PMMA resin ball in each of regions of the recorded matters obtained above, in which the coating layer was formed, was measured by means of a surface property tester (trade name: HEIDON TRIBO-GEAR TYPE 14DR; manufactured by SHINTO SCIENTIFIC CO., LTD.). The vertical load applied to the PMMA resin ball and the moving speed were controlled to 50 g and 2 mm/sec, respectively, to measure horizontal force, which acts on the moving direction of the PMMA resin ball upon movement, by a load cell, thereby calculating out the ratio of the horizontal force to the force of the vertical load as a coefficient of kinetic friction. The values of the coefficient of kinetic friction thus obtained are shown in Table 3.

(Image Density)
The image density in each of regions of the recorded matters obtained above, in which the coating layer was formed, was measured by a reflection densitometer (manufactured by X-Rite) to evaluate the recorded matters as to the image density. The evaluation standard of the image density is as follows. The evaluation results are shown in Table 3.
A: the image density is 2.0 or more;
B: the image density is less than 2.0.

(Glossiness)
The surface gloss value (20° reflection) in each of regions of the recorded matters obtained above, in which the coating layer was formed, was measured by a glossmeter (trade name: Microhaze Plus; manufactured by BYK-Gardner) to evaluate the recorded matters as to the glossiness. The evaluation standard of the glossiness is as follows. The evaluation results are shown in Table 3.
A: the surface gloss value is 30 or more;
B: the surface gloss value is less than 30.

(Scratch Resistance Against PMMA Resin Ball)
The scratch resistance in each of regions of the recorded matters obtained above, in which the coating layer was formed, was evaluated by means of a surface property tester (trade name: HEIDON TRIBOGEAR TYPE 14DR; manufactured by SHINTO SCIENTIFIC CO., LTD.) A ball (4 mm in diameter) made of a polymethyl methacrylate (PMMA) resin was used as a frictional member. The resin ball was fixed to a ball indenter holder, vertically pressed against the recorded matter and moved along the surface of the recorded matter at a rate of 40 mm/sec. The condition of a scratch at the time a vertical load applied to the resin ball was increased stepwise to 2,000 g on the maximum was evaluated. The evaluation standard of the scratch resistance against the PMMA resin ball is as follows. The evaluation results are shown in Table 3.
A: no scratch due to peeling occurs until the maximum vertical load of 2,000 g;
B: a scratch due to peeling occurs under a vertical load of from 200 g to 1,000 g;
C: a scratch due to peeling occurs under a vertical load less than 200 g.

(Scratch Resistance Against Nail)
The scratch resistance in each of regions of the recorded matters obtained above, in which the coating layer was formed, was evaluated in terms of the condition of a scratch by an actual human nail. The evaluation standard of the scratch resistance against the nail is as follows. The evaluation results are shown in Table 3.

A: neither a scratch due to peeling nor a fine surface defect occurs even when scratched repeatedly with a nail;
B: no scratch due to peeling occurs, but a surface defect occurs;
C: peeling somewhat occurs when scratched repeatedly several times with a nail;
D: a scratch due to peeling somewhat occurs when scratched with a nail.

TABLE 3

| | | Thickness of coating layer [μm] | Coefficient of kinetic friction | Image density | Glossiness | Scratch resistance against PMMA ball | Scratch resistance against nail |
|---|---|---|---|---|---|---|---|
| Example | 1 | 0.3 | 0.10 | A | A | A | A |
| | 2 | 0.3 | 0.07 | A | A | A | A |
| | 3 | 0.4 | 0.08 | A | A | A | B |
| | 4 | 0.5 | 0.12 | A | B | A | A |
| | 5 | 0.3 | 0.20 | A | A | B | B |
| | 6 | 0.3 | 0.10 | A | A | A | A |
| | 7 | 0.3 | 0.10 | A | A | A | A |
| | 8 | 0.2 | 0.25 | A | A | B | C |
| | 9 | 0.2 | 0.15 | A | A | B | B |
| | 10 | 0.3 | 0.10 | A | A | A | A |
| Comparative Example | 1 | Immeasurable | 0.55 | B | B | C | D |
| | 2 | Immeasurable | 0.45 | A | A | C | D |
| | 3 | 0.3 | 0.60 | B | B | C | D |
| | 4 | Immeasurable | 0.55 | B | B | C | D |
| | 5 | Immeasurable | 0.60 | A | A | C | D |
| | 6 | 0.3 | 0.60 | A | A | C | C |

The coating layer after the recorded matter of Example 3 had been evaluated as to the scratch resistance against the nail was finely scratched. The reason for it is considered to be attributable to the fact that the strength of the coating layer is not sufficient because the Young's modulus of the coating layer is low. When the coating layer in the recorded matter of Example 4 was visually observed, particles large in form were partially present, and the glossiness was irregular. When the coating layers in the recorded matters of Examples 1 and 10 were visually observed, the irregularities of the glossiness of the coating layer in Example 10 were more reduced than the coating layer in Example 1, and so the coating layer in Example 10 had excellent glossiness.

Recorded articles of Examples 11 to 16 were produced in the same manner as in Examples 2 and 5 to 9 except that the conditions of recording passes were made the same as in Example 10 without changing the recording duty. In other words, a mask pattern with which the pigment ink is applied by from the first pass to the seventh pass and that with which the coating liquid is applied by the seventh pass and eighth pass were used, and the coating liquid was applied in the seventh pass so as not to overlap a pixel of the seventh pass in the ink. The coating layers in the recorded matters of Examples 11 to 16 thus obtained were more reduced in irregularities of the glossiness than the coating layers in Examples 2 and 5 to 9, and so the such coating layers had excellent glossiness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-331327, filed Dec. 8, 2006, No. 2006-331328, filed Dec. 8, 2006, and No. 2007-297648, filed Nov. 16, 2007, which are hereby incorporated by reference in their entirety.

What is claimed is:

1. An image coating liquid for use in an ink jet recording method comprising (1) an image forming step of forming an image on a recording medium by an ink jet system with an ink comprising at least a pigment, and (2) a coating layer forming step of applying a coating liquid at least to a region including the image to form a coating layer having a film thickness of from 0.10 μm or more to 1.0 μm or less in at least a part thereof, the coating liquid comprising:
   a polydimethylsiloxane-modified resin as a slippery compound;
   water; and
   a water-soluble organic solvent,
   wherein the polydimethylsiloxane-modified resin has a 50% cumulative volume average particle size of more than 0 nm and 300 nm or less, and
   wherein the coating layer has a coefficient of kinetic friction of 0.40 or less.

2. An ink jet recording method for conducting formation of an image with an ink comprising at least a pigment and formation of a coating layer with the coating liquid according to claim 1 by scanning a recording head plural times on a unit region of a recording medium using the recording head which ejects the ink and the coating liquid based on each an ink ejection data and a coating liquid ejection data by an ink jet system, the method comprising:
   an ejection data generation step of generating a coating liquid ejection data for ejecting the coating liquid on the unit region after completion of the formation of the image with the ink; and
   a control step of controlling ejecting the coating liquid from the recording head based on the coating liquid ejection data generated by the ejection data generation step,
   wherein the ejection data generation step generates the coating liquid ejection data so as to eject the coating liquid upon at least one scan including a final scan to the unit region among the scans of the plural times.

3. An ink jet recording apparatus for conducting formation of an image with an ink comprising at least a pigment and formation of a coating layer with the coating liquid according to claim 1 by scanning a recording head plural times on a unit region of a recording medium using the recording head which ejects the ink and the coating liquid based on each an ink ejection data and a coating liquid ejection data by an ink jet system, the apparatus comprising:

an ejection data generation unit for generating a coating liquid ejection data for ejecting the coating liquid on the unit region after completion of the formation of the image with the ink; and a control unit for controlling ejecting the coating liquid from the recording head based on the coating liquid ejection data generated by the ejection data generation unit, wherein the ejection data generation unit generates the coating liquid ejection data so as to eject the coating liquid upon at least one scan including a final scan to the unit region among the scans of the plural times.

4. The ink jet recording apparatus according to claim 3, further comprising a detecting unit for detecting a scan upon completion of the image formation with the ink among the scans of the plural times for every unit region based on the ink ejection data for ejecting the ink from the recording head, wherein the ejection data generation unit generates the coating liquid ejection data based on the detected result generated by the detecting unit so as to eject the coating liquid upon at least one scan including a final scan to the unit region among the scans of the plural times inclusive of the scan upon the completion of the image formation.

5. The ink jet recording apparatus according to claim 3, wherein the ink ejection data for ejecting the ink from the recording head is divided into plural scans of the recording head using a mask pattern, and wherein the ejection data generation unit generates the coating liquid ejection data using the mask pattern.

6. The ink jet recording apparatus according to claim 3, wherein the ejection data generation unit thins down the coating liquid ejection data corresponding to the plural unit regions in a predetermined proportion using a mask pattern for the coating liquid.

7. An image coating liquid for use in an ink jet recording method comprising (1) an image forming step of forming an image on a recording medium by an ink jet system with an ink comprising at least a pigment, and (2) a coating layer forming step of applying a coating liquid at least to a region including the image to form a coating layer having a film thickness of from 0.10 μm or more to 1.0 μm or less in at least a part thereof, the coating liquid comprising:

a polydimethylsiloxane-modified resin as a slippery compound;

water; and a water-soluble organic solvent, wherein the content (% by mass) of the polydimethylsiloxane-modified resin is from 1.0% by mass or more to 20.0% by mass or less based on the total mass of the coating liquid, and wherein the coating layer has a coefficient of kinetic friction of 0.40 or less.

8. An image coating liquid for use in an ink jet recording method comprising (1) an image forming step of forming an image on a recording medium by an ink jet system with an ink comprising at least a pigment, and (2) a coating layer forming step of applying a coating liquid at least to a region including the image to form a coating layer having a film thickness of from 0.10 μm or more to 1.0 μm or less in at least a part thereof, the coating liquid comprising:

an acrylsilicone copolymer as a slippery compound;

water; and a water-soluble organic solvent, wherein the coating layer has a coefficient of kinetic friction of 0.40 or less.

9. An image coating liquid for use in an ink jet recording method comprising (1) an image forming step of forming an image on a recording medium by an ink jet system with an ink comprising at least a pigment, and (2) a coating layer forming step of applying a coating liquid at least to a region including the image to form a coating layer having a film thickness of from 0.10 μm or more to 1.0 μm or less in at least a part thereof, the coating liquid comprising:

a silicone oil as a slippery compound;

water;

a resin: and a water-soluble organic solvent, wherein the content A (% by mass) of the resin is from 1.0% by mass or more to 20.0% by mass or less based on the total mass of the coating liquid, and wherein the coating layer has a coefficient of kinetic friction of 0.40 or less.

10. The coating liquid according to claim 9, wherein the silicone oil is a polyalkylene oxide-modified silicone oil.

11. The coating liquid according to claim 9, wherein the resin has an acid value of from 50 mg KOH/g or more to 250 mg KOH/g or less.

12. The coating liquid according to claim 11, wherein the resin has a glass transition temperature of from 20° C. or more to 100° C. or less.

13. The coating liquid according to claim 11, wherein the resin has a film-forming property.

14. The coating liquid according to claim 11, wherein the coating layer is formed on the layer formed by the pigment, and the silicone oil stays in the coating layer.

15. An image coating liquid for use in an ink let recording method comprising (1) an image forming step of forming an image on a recording medium by an ink let system with an ink comprising at least a pigment, and (2) a coating layer forming step of applying a coating liquid at least to a region including the image to form a coating layer having a film thickness of from 0.10 μm or more to 1.0 μm or less in at least a part thereof, the coating liquid comprising:

a silicone oil as a slippery compound;

water;

a resin; and a water-soluble organic solvent, wherein a ratio B/A of the content B (% by mass) of the silicone oil to the content A (% by mass) of the resin based on the total mass of the coating liquid satisfies the relation of the following expression (1), $0 < B/A \leq 1$ (1), and wherein the coating layer has a coefficient of kinetic friction of 0.40 or less.

16. An image coating liquid for use in an ink jet recording method comprising (1) an image forming step of forming an image on a recording medium by an ink jet system with an ink comprising at least a pigment, and (2) a coating layer forming step of applying a coating liquid at least to a region including the image to form a coating layer having a film thickness of from 0.10 μm or more to 1.0 μm or less in at least a part thereof, the coating liquid comprising:
- a polydimethylsiloxane-modified resin as a slippery compound;
- water; and
- a water-soluble organic solvent,
- wherein the polydimethylsiloxane-modified resin has a 50% cumulative volume average particle size of more than 0 nm and 300 nm or less, and
- wherein the slippery compound keeps the coefficient of kinetic friction of the coating layer to 0.40 or less.

17. An image coating liquid for use in an ink jet recording method comprising (1) an image forming step of forming an image on a recording medium by an ink jet system with an ink comprising at least a pigment, and (2) a coating layer forming step of applying a coating liquid at least to a region including the image to form a coating layer having a film thickness of from 0.10 μm or more to 1.0 μm or less in at least a part thereof, the coating liquid comprising:
- a silicone oil as a slippery compound;
- water;
- a resin; and
- a water-soluble organic solvent,
- wherein the content A (% by mass) of the resin is from 1.0% by mass or more to 20.0% by mass or less based on the total mass of the coating liquid, and
- wherein the slippery compound keeps the coefficient of kinetic friction of the coating layer to 0.40 or less.

18. An ink jet recording method comprising:
- an image forming step of forming an image on a recording medium by an ink jet system with an ink comprising a pigment; and
- a coating layer forming step of applying an image coating liquid at least to a region including the image to form a coating layer,
- wherein the image coating liquid comprises a polydimethylsiloxane-modified resin as a slippery compound, water, and a water-soluble organic solvent,
- wherein the polydimethylsiloxane-modified resin has a 50% cumulative volume average particle size of more than 0 nm and 300 nm or less, and
- wherein the coating layer has a film thickness of from 0.10 μm or more to 1.0 μm or less in at least a part thereof and a coefficient of kinetic friction of 0.40 or less.

19. The ink jet recording method according to claim 18, wherein the coating liquid is applied by one of an ink jet system and a roll coating system.

20. An ink jet recording method comprising:
- an image forming step of forming an image on a recording medium by an ink jet system with an ink comprising a pigment; and
- a coating layer forming step of applying an image coating liquid at least to a region including the image to form a coating layer,
- wherein the image coating liquid comprises a polydimethylsiloxane-modified resin as a slippery compound, water, and a water-soluble organic solvent,
- wherein the content (% by mass) of the polydimethylsiloxane-modified resin is from 1.0% by mass or more to 20.0% by mass or less based on the total mass of the image coating liquid, and
- wherein the coating layer has a film thickness of from 0.10 μm or more to 1.0 μm or less in at least a part thereof and a coefficient of kinetic friction of 0.40 or less.

21. An ink jet recording method comprising:
- an image forming step of forming an image on a recording medium by an ink jet system with an ink comprising a pigment; and a coating layer forming step of applying an image coating liquid at least to a region including the image to form a coating layer, wherein the image coating liquid comprises an acrylsilicone copolymer as a slippery compound, water, and a water-soluble organic solvent, and wherein the coating layer has a film thickness of from 0.10 μm or more to 1.0 μm or less in at least a part thereof and a coefficient of kinetic friction of 0.40 or less.

22. An ink jet recording method comprising:
- an image forming step of forming an image on a recording medium by an ink jet system with an ink comprising a pigment; and
- a coating layer forming step of applying an image coating liquid at least to a region including the image to form a coating layer,
- wherein the image coating liquid comprises a silicone oil as a slippery compound, water, a resin, and a water-soluble organic solvent,
- wherein the content A (% by mass) of the resin is from 1.0% by mass or more to 20.0% by mass or less based on the total mass of the image coating liquid, and
- wherein the coating layer has a film thickness of from 0.10 μm or more to 1.0 μm or less in at least a part thereof and a coefficient of kinetic friction of 0.40 or less.

23. An ink jet recording method comprising:
- an image forming step of forming an image on a recording medium by an ink jet system with an ink comprising a pigment; and
- a coating layer forming step of applying an image coating liquid at least to a region including the image to form a coating layer,
- wherein the image coating liquid comprises a silicone oil as a slippery compound, water, a resin, and a water-soluble organic solvent,
- wherein a ratio B/A of the content B (% by mass) of the silicone oil to the content A (% by mass) of the resin based on the total mass of the image coating liquid satisfies the relation of the following expression (1), $$0 < B/A \leq 1 \qquad (1),\text{ and}$$

wherein the coating layer has a film thickness of from 0.10 μm or more to 1.0 μm or less in at least a part thereof and a coefficient of kinetic friction of 0.40 or less.

* * * * *